US008983648B2

(12) United States Patent
Kreitmeier et al.

(10) Patent No.: US 8,983,648 B2
(45) Date of Patent: Mar. 17, 2015

(54) METHOD AND DEVICE FOR SORTING TWO TYPES OF OBJECTS IN MULTIPLE SORTING PASSES

(75) Inventors: Franz Kreitmeier, Constance (DE); Wolf-Stephan Wilke, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 14/129,603

(22) PCT Filed: Jun. 26, 2012

(86) PCT No.: PCT/EP2012/062300

§ 371 (c)(1), (2), (4) Date: Dec. 27, 2013

(87) PCT Pub. No.: WO2013/000885

PCT Pub. Date: Jan. 3, 2013

(65) Prior Publication Data

US 2014/0121826 A1 May 1, 2014

(30) Foreign Application Priority Data

Jun. 27, 2011 (DE) ........................ 10 2011 078 094

(51) Int. Cl.
*G06F 7/00* (2006.01)
*B07C 3/00* (2006.01)

(52) U.S. Cl.
CPC ........................................ *B07C 3/00* (2013.01)
USPC ........... 700/223; 700/213; 700/219; 700/220; 700/221; 700/224; 700/226; 700/228

(58) Field of Classification Search
None
See application file for complete search history.

(56) References Cited

U.S. PATENT DOCUMENTS 3,363,967 A 1/1968 Schmitt
5,363,967 A 11/1994 Tilles et al.

(Continued)

FOREIGN PATENT DOCUMENTS

DE 10148226 C1 4/2003
DE 10305847 B3 8/2004

(Continued)

*Primary Examiner* — Yolanda Cumbess
(74) *Attorney, Agent, or Firm* — Laurence A. Greenberg; Werner H. Stemer; Ralph E. Locher

(57) ABSTRACT

Two types of objects are sorted in multiple sorting passes, for instance flat mail items are precisely sorted into a delivery sequence. Objects of a first object type are fed to a sorting system from a first feeding device. Objects of a second object type are fed from a second feeding device. The sorting system sorts the objects in at least two successive sorting passes. A first sorting plan and a second sorting plan are used in each sorting pass except in the last sorting pass, where a sorting plan is used. Each first sorting plan assigns a sorting end location of a first sorting end-location region and each second sorting plan assigns a sorting end location of a second sorting end-location region. A sorting end location is selected for each object using a sorting plan in each sorting pass, and the object is transferred into the selected sorting end location.

12 Claims, 5 Drawing Sheets

(56) References Cited

U.S. PATENT DOCUMENTS

| | | | |
|---|---|---|---|
| 5,518,122 | A | 5/1996 | Tilles et al. |
| 6,501,041 | B1 | 12/2002 | Burns et al. |
| 7,397,010 | B2 | 7/2008 | Wilke |
| 7,728,244 | B2 | 6/2010 | De Leo et al. |
| 7,979,155 | B2 | 7/2011 | Moran et al. |
| 2005/0279674 | A1 | 12/2005 | Gillet |
| 2006/0278501 | A1 | 12/2006 | Sweazy |
| 2007/0090028 | A1 | 4/2007 | Varney |
| 2008/0000817 | A1 | 1/2008 | Kostyniuk et al. |
| 2010/0286815 | A1 | 11/2010 | Zimmermann |
| 2011/0180462 | A1 | 7/2011 | Cartal et al. |
| 2011/0260393 | A1* | 10/2011 | Balogh et al. ................ 271/264 |

FOREIGN PATENT DOCUMENTS

| | | | |
|---|---|---|---|
| DE | 102009060515 | A1 | 6/2011 |
| EP | 0072310 | A1 | 2/1983 |
| EP | 1872869 | A2 | 1/2008 |
| EP | 2091012 | A1 | 8/2009 |
| EP | 1970131 | B1 | 9/2010 |
| EP | 2253390 | A1 | 11/2010 |
| WO | 2005089965 | A1 | 9/2005 |
| WO | 2006029212 | A2 | 3/2006 |
| WO | 2010072935 | A1 | 7/2010 |

* cited by examiner

METHOD AND DEVICE FOR SORTING TWO TYPES OF OBJECTS IN MULTIPLE SORTING PASSES

BACKGROUND OF THE INVENTION

Field of the Invention

The invention relates to a method and a sorting system for common sorting of two types of items in multiple sorting passes, in particular for sorting flat postal items into a delivery sequence by delivery points.

A method of the generic type and a sorting system of the generic type are known from European Patent EP 1970131 B1.

In EP 1970131 B1 a mail sorting and sequencing system for postal items is described. This mail sorting and sequencing system 1 is capable of sorting three types of postal items: Regular mail 7a, flats 7b and oversized mail 7c which are difficult to process. A delivery point packaging unit 2 (DPP unit) possesses three types of feed unit (feed units 15a, 15b, 15c), namely one feed unit in each case for each type of postal item 7a, 7b, 7c. All feed units 15a, 15b, 15c feed the items into the same conveyor system 9, which has a path 13. A number of trucks 11 move along this path 13, cf. FIG. 1. In one embodiment each truck 11 possesses its own drive 49m as well as a number of receiving pockets for one postal item in each case, cf. FIG. 4. The DPP unit 2 further possesses an accumulating device 20 below the path 13, cf. FIG. 12. The accumulating device 20 has a number of trap units 161 each with a number of side walls 170. Below the accumulating device 20 there are a number of accumulating units 159, which are separated from one another by partitions 151.

A postal item is fed by means of the appropriate feed unit 15a, 15b, 15c to the DPP unit 2 of the sorting system of EP 1970131 B1 and arrives in a pocket of a truck 11. In a transfer section 13s of the path 13 the pocket opens and the postal item slides downwards out of the pocket into a trap unit 161. From this trap unit 161 the postal item subsequently slides downwards into an accumulating unit 159. A stack of horizontal postal items is formed by this process in each accumulating unit 159.

In an exemplary embodiment of EP 1970131 B1 a number of DPP units 2 are used. In a first step a first DPP unit 2 sorts the flats 7b. A second DPP unit 2 sorts the oversized mail 7c. Both DPP units 2 distribute the postal items to regions of delivery addresses. A mail sorting and sequencing machine 80 sorts the letters 7a. In a second step the first DPP unit 2 allocates the flats 7b one after the other for a delivery address region to route sections of a carrier. The second DPP unit 2 does the same for the oversized mail 7c. In the third step all postal items for a respective route section are fed to the same sorting system, and this is done via the three feed units 15a, 15b, 15c for the three postal item types. A single sequence of these postal items of a route section is established in accordance with a predetermined carrier walk.

In DE 103 05 847 B3 a sorting system for flat postal items is described. This sorting system possesses three parallel postal item transfer pocket units 1. In each postal item transfer pocket unit 1 a series of storage pockets 10 is able to be transported along a closed conveyor path. The conveyor path of each postal item transfer pocket unit 1 leads past a loading station 7. This loading station 7 pushes one flat postal item in each case into a storage pocket 10 of the postal item transfer pocket unit 1. A respective item separation facility 3 sends separated postal items to a loading station 7. Below the three postal item transfer pocket units 1 there is a transport path 9, on which trays 12 open at the top are transported. A separated postal item is brought into a storage pocket 10 and subsequently slides downwards out of this storage pocket 10 into a tray 12.

In EP 1 894 637 B1 a sorting system for flats and letters is described. This sorting system possesses stationary stacking points SB1 to SBz for the letters as well as end locations E1 to Ey for flats. The end locations E1 to Ey are transported along a closed conveyor path. Each stacking point SB1 to SBz for letters and each end location E1 to Ey for flats is assigned a destination address in each case. The regular letters are sorted outside this sorting system and letters with the assigned destination address are brought into each letter stacking point SB1. A flat is fed into a stacking point SG1 to SGy, e.g. into a storage pocket and is transported in this stacking point along a closed conveyor path to a transfer position in relation to such an end location E1 to Ey, which is assigned to the destination address of this flat. The flat slides out of the stacking point in this end location. After the flats have been distributed to the circulating end locations E1 to Ey the regular letters are brought from a letter stacking point SB1 to SBz into that end location E1 to Ey which is assigned to the common delivery address of these letters from the letter stacking point SB1 to SBz. Through this a stack of letters and flats to the same delivery address is established in each end location E1 to Ey.

In U.S. Pat. No. 6,501,041 B1 a sorting system for flat articles is described, e.g. for postal items. Two primary sort assemblies 12a, 12b supply items to the same subsequent delivery point sequence (DPS) sort assembly 14, cf. FIG. 1. A conveying assembly 24 transports trays filled with postal items from the two outputs 26 of the primary sort assembly 12a, 12b to the induct 20 of the DPS sort assembly 14. The two parallel primary sort assemblies 12a, 12b decode the respective destination address of each postal item. The DPS sort assembly 14 works twice as fast as the two parallel primary sort assemblies 12a, 12b and puts the supplied postal items into a sequence.

In U.S. Pat. Nos. 5,363,967 and 5,518,122 a sorting system with an auto feed 30, a manual feed 35, a unit read/print (encoder) 40, an inserter 45 and a unit stacker/transport 55 is described, cf. FIG. 1. Postal items are fed both automatically with the auto feed 30 and also manually with the manual feed 35 into an induction transfer line 25. A sequence of light barriers monitors the transport of the postal items along this transfer line 25. The postal items are carried past the read/print unit 40. The transfer line 25 transports the postal items onwards to the inserter 45. This inserter 45 selects a carrier for a postal item transported to it and puts the postal item onto this carrier. The stacker/transport unit 55 transports carriers with postal items along a conveyor path which runs past bins 60, 90. The postal items are distributed to these sort end locations 60, 90.

In US 2007/0090028 A1 an arrangement with a number of sorters operating in parallel is described. FIG. 2 shows an arrangement with four sorters 400a-400b, which supply different bin locations 405a-405d with flat postal items. In FIG. 3 the sorters 400a and 400d are supplied by an unload module 100a, 100f each with a subsequent singulator unit 115. The other two sorters 400b and 400c are each supplied by two unload modules 100b-100e each with a subsequent singulator unit 115. In FIG. 4 a recirculation line 450 leads from the sorter 400a to the unload modules 100a-100e. FIG. 5 shows a variation with three intermediate sort conveyors 300a, 300b, 300c", which each connect two sorters to one another. An intermediate sort conveyor 300a, 300b, 300c is also capable of outputting postal items to an intermediate pre-sorter 500, cf. FIG. 5 and FIG. 6. FIG. 7 shows a load distribution between these components.

In EP 72310 B1 a sorting system with a conveyor 5 is described. The conveyor 5 transports items along a closed conveyor path and unloads the items into different groups of sorting end locations P, R, R1, R2. In this process the items are allocated to these sorting end locations. A pre-sorter 15 divides the supplied items into two streams (11, 12). Each stream 11, 12 is transported to a respective feeder station $I_{11}$, $I_{12}$ and brought from this feeder station to the closed conveyor path. The pre-sorter 15 distributes the items such that the following effect is achieved: All items which are supplied from a feeder station to the closed conveyor path are unloaded into sorting end locations before these items reach the next feeder station situated downstream.

DE 10 2009 060 515 A1 describes how two types of items are sorted in accordance with a predetermined sorting feature, namely items of a first item type (e.g. flats) and items of a second item type (e.g. regular letters). The items of the second item type are sorted by a sorting system in accordance with the sorting feature. The items of the first item type (e.g. the flats) are then inserted in stages into the generated sequence of items of the second item type (e.g. the regular letters), e.g. manually at a workstation. For this purpose a placeholder with a unique identification is created for each item of the first item type. The sorting system sorts these placeholders together with the items of the second item type. Subsequently the placeholder is replaced, e.g. by a worker, with the associated item. On a screen-based device, for each item of the first item type an image of this item as well as the code of the associated placeholder for this item is displayed. For example an image of the placeholder is shown on the screen-based device, wherein this image shows the code of the placeholder. This display makes it easier for the worker to find the placeholder in the sequence as well as the real item of the first item type in a tray.

WO 2005/089965 A1 and US 2005/0279674 A1 likewise describe how two types of postal items are sorted in accordance with the delivery sequence of a carrier, namely letters and flats. A first sorting system 2 exclusively sorts the letters 1, a second sorting system exclusively sorts the flats 4. The two sorting systems 2, 5 apply corresponding sorting plans to allocate postal items to the sorting outlets, so that a group of delivery addresses are assigned both a sorting outlet 3 of the sorting system 2 for letters 1 and also a sorting outlet 6 of the sorting system 5 for flats 4. A worker takes the letters 1 for this group out of the assigned sorting outlet 3 and the flats 4 for the same group from the assigned sorting outlet 6 and creates a single bundle 7. Subsequently the worker manually distributes the postal items 1, 4 of this bundle 7 to trays 8, wherein each tray is assigned a respective delivery point.

In WO 2006/029212 A2 a sorting system with a main track assembly 70 is described, cf. FIG. 1. The main track assembly 70 transports a plurality of cartridges 40 along a conveyor path having two straight sections 72 and two semicircular-shaped sections 73. An induction section 74 feeds items to be sorted, e.g. letters and flats, into cartridges 40. The items in the cartridges 40 are distributed to bins 32. These bins 32 are transported in two parallel rows of two parallel conveyors 33A, 33B. In order to be able to optionally unload an item into a bin 32 on the inner conveyor 33B or into a bin 32 on the outer conveyor 33A, a cartridge 40 is able to be moved transverse to the direction of transport of the track assembly 40 outwards and inwards, e.g. on two guide rails, and through this is able to be brought into an unloading position in relation to each bin 32. Chute/buffer modules 100 can be arranged between the cartridges 40 and the bins 32 on the conveyors 33A, 33B, cf. FIG. 3.

In WO 2010/072935 A1 and US 2011/0180462 a sorting system is described which sorts both letters and also flats. A first sorting system 21 distributes the flats to sorting outlets 25, which each comprise two racks 26. A second sorting system 1 sorts the letters and distributes these letters to sorting outlets 5 each with a stacker 7. These two sorting systems 21, 1 are arranged above one another, cf. FIG. 2. The two sorting systems 1, 21 have equal numbers of sorting outlets and each sorting outlet 25 with the racks 26 of the first sorting system 21 is arranged above a sorting outlet 5 with a stacker 7 of the second sorting system 1. The first sorting system 21 also has an unstacker 22 for flats. The second sorting system 1 has a feeder device with an unstacker 2 for letters.

In DE 10148226 C1 a device is described which distributes flat postal items in accordance with their thicknesses into a number of thickness classes. The device has a number of separator stages following on from one another. The device is fed a stream of postal items of different thicknesses by means of a conveyor belt 2. Each separator stage takes from this stream all those postal items that are thicker than a predetermined thickness value and transports these thicker postal items away with a conveyor belt. Thinner postal items squeeze through a gap of the separator stage, wherein this gap is as wide as the thickness value.

BRIEF SUMMARY OF THE INVENTION

The underlying object of the invention is to provide a method with the generic features and a sorting system with the generic features which better utilizes the sorting end locations of the sorting system, especially when more items of the first item type are to be sorted than items of the second item type.

The object is achieved by a method with the features as claimed and a sorting system with the features as claimed. Advantageous embodiments are specified in the dependent claims.

The invention relates to a sorting method and a sorting system which sorts a number of items in accordance with a predetermined sorting feature. Each item to be sorted belongs either to a first item type or to a second item type. The items of the first item type differ from the items of the second item type by at least one physical attribute.

All items to be sorted are sorted by a sorting system. This sorting system used comprises

- At least one first feeder device for items of the first item type,
- At least one second feeder device for items of the second item type,
- At least one measuring device for each sorting pass,
- A selection unit,
- A data memory for sorting plans able to be evaluated by a computer,
- A transport device and
- A number of sorting end locations.

The process of sorting items in a sorting pass includes the step of distributing these items in accordance with their sort feature values to the sorting end locations. A sequence among sorting end locations as well as an established sequence of items in a sorting end location has the effect that, after the last sorting pass, a sequence is established among all items to be sorted in the sorting end locations.

The sorting system used performs at least two consecutive sorting passes. In each sorting pass except for the last sorting pass the sorting end locations used are logically subdivided into a first sorting end location region and into a second sorting end location region. The first sorting end location region consists of more sorting end locations than the second sorting end location region. In the last sorting pass, the sorting end locations are not subdivided into two regions. This embodiment is especially advantageous in the event of the following condition applying for the items to be sorted: The first item type comprises more items to be sorted than the second item type.

For each sorting pass other than for the last sorting pass a first sorting plan able to be evaluated by a computer and a second sorting plan able to be evaluated by a computer are stored in the data memory. Also stored in the data memory is a sorting plan able to be evaluated by a computer for the last sorting pass. In the case of two sorting passes a first sorting plan and a second sorting plan for the first sorting pass are stored in the data memory as well as a further sorting plan for the second and at the same time the last sorting pass.

As already mentioned, in each sorting pass except for the last sorting pass, the sorting end locations are logically subdivided into a first sorting end location region and a second sorting end location region. Each sorting plan assigns at least one sorting end location in each case to each sorting feature value occurring. As a rule each sorting plan assigns the same sorting end location to different sorting feature values, because more different sorting feature values occur than the sorting system has sorting end locations. It is possible that, in addition to a sorting end location, a sorting plan also assigns a reserve sorting end location to a sorting feature value.

Each first sorting plan assigns a sorting end location of the first sorting end location region to each sorting feature value occurring. Each second sorting plan assigns a sorting end location of the second sorting end location region to each sorting feature value occurring.

In the last sorting pass the sorting end locations are not subdivided into two sorting end location regions. The sorting plan for the last sorting pass assigns at least one sorting end location of the sorting system used to each sorting feature value occurring.

Each first sorting plan is used to sort the items of the first item type. Each second sorting plan is used to sort the items of the second item type. In order to employ the correct sorting plan, in each sorting pass—except in the last sorting pass—it is established whether an item to be sorted belongs to the first type or to the second item type.

For each item to be sorted, in accordance with the solution, the following steps are carried out in each sorting pass:

- the item is fed to the sorting system by means of a feeder device.
- the fed item passes through the sorting system.
- the respective measuring device for the sorting pass measures the value that the predetermined sorting feature assumes for this item.
- the selection unit automatically selects for the item a sorting end location of the sorting system. For this purpose the selection unit applies a sorting plan stored in the data memory for this sorting pass to the measured sorting feature value.
- the transport device transports the item to the selected sorting end location.
- the sorting system unloads the item into the selected sorting end location.

The step of feeding an item to the sorting system for the purposes of a sorting pass is performed for each sorting pass as follows:

- If the item belongs to the first item type the item is fed for each sorting pass by means of the first or a first feeder device.
- If the item belongs to the second item type the item is fed for each sorting pass by means of the second or a second feeder device.

During sorting the sorting system operates in each sorting pass except for the last sorting pass as follows:

- A decision is made as to whether the item belongs to the first item type or to the second item type.
- If the item belongs to the first item type, the selection unit applies the first sorting plan for this sorting pass to the measured sorting feature value of this item in this sorting pass. If the item belongs to the second item type, the selection unit applies the second sorting plan for this sorting pass to the measured sorting feature value in this sorting pass.
- Through this an item of the first item type is unloaded into a sorting end location of the first sorting end location region, an item of the second item type into a sorting end location of the second sorting end location region.

In the last sorting pass the selection unit applies the one sorting plan for the last sorting pass to the measured sorting feature value.

The invention makes it possible to sort at least two different types of items simultaneously and with the same sorting system. It is not necessary to use a number of sorting systems, especially not a sorting system for each type of item. The invention thus removes the necessity of synchronizing different sorting systems with one another. The invention further dispenses with a workstation at which different types of items are merged.

This one sorting system possesses at least one feeder device in each case per item type. This feeder device is tailored to the respective item type and is therefore capable of achieving a higher throughput than a universal feeder device, which is suitable for any type of item. The specific feeder device also achieves a higher process safety than a universal feeder device. In addition a specialized feeder device can often be realized with a smaller footprint than a universal feeder device because the dimensions that the items of an item type will have are known. The sorting end locations of the sorting system used can by contrast all be embodied the same.

In particular the invention makes it possible to use a first feeder device, which is capable of feeding each item of the first item type but not necessarily each item of the second item type, for feeding items of the first item type and which for items of the first item type achieves a sufficiently high throughput with sufficient reliability. This first device can operate fully automatically. For feeding items of the second item type a feeder device with a lower throughput can be used, e.g. a manual feeder device. Since fewer items of the second item type than items of the first item type are to be sorted, the throughput through the sorting system does not fall significantly by comparison with using a universal feeder device. This is above all of advantage if more items of the first item type are to be sorted than items of the second item type.

In accordance with the solution the sorting system carries out at least two sorting passes. This makes it possible to even sort the items in accordance with a predetermined sequence using the sort feature values if there are more different sort feature values than the sorting system has sorting end locations. In this case a single sorting pass is not sufficient to sort all items in accordance with the sequence. The sorting system thus carries out an n-pass sequencing with $n \geq 2$. After the last sorting pass items with different sorting feature values are unloaded into at least one sorting end location.

In each sorting pass except for the last sorting pass the items to be sorted of the first item type are distributed to the sorting end locations of the first sorting end location region, the items of the second item type to the sorting end locations of the second sorting end location region. This makes it easier to feed the items from this sorting end location to the sorting system again after the sorting pass by means of the appropriate feeder device. All items in a sorting end location namely belong to the same item type. It is not necessary to separate the items in a sorting end location before feeding to a further sorting pass in accordance with item types in order to then feed them again to the sorting system by means of the appropriate feeder device in each case.

In the last sorting pass on the other hand the items are distributed independently of the item type to all sorting end locations used. After the last sorting pass both at least one item of the first item type and also one item of the second item type are unloaded into a sorting end location. After the last sorting pass the items are not fed to the sorting system again. This makes it possible to sort all items in accordance with a single sequence using the sorting feature values. The invention makes it possible to use similar sorting end locations for both item types. Furthermore, the invention makes it possible to use the same sorting end locations in both sorting passes. The distribution to two sorting end location regions in the first sorting pass is able to be realized exclusively by corresponding sorting plans, i.e. by software and fully automatically, without the sorting system used having to be mechanically modified.

Since in each sorting pass at least two different feeder devices are used for feeding the items and because each feeder device only feeds items of a specific item type, at least two streams of items reach the sorting system, wherein each stream consists exclusively of items of one item type. Because two "item-pure" streams pass through the sorting system, the need for the sorting system to have to divide up the items according to item type after they have been fed into it is avoided. In particular this avoids the sorting system having to measure a physical parameter in order to decide whether an item belongs to the first item type or to the second item type. Furthermore savings are made in storage locations and transport paths for distribution. Thanks to the invention it is instead sufficient for the sorting system to follow and log the path of an item through the sorting system and also to log the feeder device from which this item was fed. Preferably the sorting system establishes in this way whether an item belongs to the first item type or to the second item type, i.e. by the sorting system establishing automatically by means of which feeder device this item was fed to the sorting system.

The invention is used to sort items of a first item type and items of a second item type together. In accordance with the solution in each sorting pass except for in the first sorting pass the first sorting end location region includes more sorting end locations than the second sorting end location region. These two sorting end location regions of sorting end locations are disjoint, i.e. one sorting end location of the sorting system belongs in each sorting pass except for the last sorting pass either to the first sorting end location region or to the second sorting end location region. It is possible for a sorting end location of the sorting system to belong neither to the first sorting end location region nor to the second sorting end location region, but for example to be an overflow sorting end location or a sorting end location for error items or to be used in another sorting process, wherein a number of sorting processes are carried out overlapping in time.

Because the first sorting end location region includes more sorting end locations than the second sorting end location region, the sorting end locations used in the sorting pass are better utilized than if both sorting end location regions were to include an identical number of sorting end locations. As a rule it is known beforehand or to be expected as a result of historical data to which of the two item types more items to be sorted will belong. The item type with more items to be sorted is used as the first item type and the first feeder devices are used to feed these items of the first item type. The advantage of better utilization is achieved above all if each sorting end location is capable of accepting both items of the first item type and also items of the second item type.

The numerical ratio of items to be sorted of the first item type to items of the second item type can vary from sorting process to sorting process. Each sorting process comprises at least two sorting passes carried out in accordance with the inventive solution in each case. The sorting system used, thanks to the invention, is able to be easily adapted to different numerical ratios between the first item type and the second item type. This adaptation can be carried out anew for each sorting process. For this adaptation exclusively the sorting plans for the sorting passes need to be adapted, wherein the sorting plan for the last sorting pass does not need to be adapted. By the adaptation of the sorting plans for a sorting pass it is defined which sorting end locations in this sorting pass belong to the first sorting end location region and which sorting end locations to the second sorting end location region. The sorting system does not need to be changed physically. The sorting plans alone define which sorting end locations in this sorting pass belong to which sorting end location region.

This adaptation can be carried out for the current sorting process based on current figures if it has already been counted before the first sorting pass how many items of the first item type and how many items of the second item type are to be sorted in this current sorting process. This adaptation is then also able to be performed on the basis of historical data which was obtained in previous sorting processes and is statistically evaluated.

If at least three sorting passes are carried out, a sorting end location can belong to the first sorting end location region in the first sorting pass and to the second sorting end location region in the second sorting pass or vice versa.

This enables the sorting system to be adapted after the first sorting pass to a numerical ratio between items of the first item type and items of the second item type, wherein a count was undertaken in the first sorting pass as to how many items to be sorted belong to the first item type and how many to the second item type.

The invention removed the necessity to have to provide a placeholder for the items of an item type in each case and then to sort the items of the other item type together with the placeholders. This would require each placeholder to be replaced later by the associated item, which is often only possible manually. Thanks to the invention items of both item types can be automatically sorted instead without generating, using and later having to replace placeholders.

The sorting process in accordance with the solution and the sorting system in accordance with the solution are able to be realized e.g. for sorting flat postal items, by a sorting system for flats already currently available being supplemented by one feeder device for items of the second item type. Such a sorting system for flats made by Siemens has been known by the name Open Mail Handling System (OMS). Concepts of OMS are described example DE 10305847 B3, DE 10342464 B3, DE 10342463 B3 and EP 2011578 A1.

Preferably each sorting plan assigns a number of value groups a sorting end location group in each case. Each value group consists of at least one sorting feature value. In each case at least one value group in each sorting plan consists of a number of sorting feature values. Each actually occurring sorting feature value belongs to precisely one value group. Each sorting end location group which occurs in a sorting plan consists of at least one sorting end location. Each sorting end location of a sorting end location group of a first sorting plan belongs to the first sorting end location region. Each sorting end location of a sorting end location group of a second sorting plan belongs to the second sorting end location region. Each value group of the first sorting plan of a sorting pass is a subset of a value group of the second sorting plan of this sorting pass. This means that the first sorting plan has more value groups than the second sorting plan, because the first sorting plan delivers a finer subdivision of the sorting feature values into value groups.

This has the following effect in this sorting pass: All items of the first item type of which the sorting feature values belong to the same first value groups are unloaded into sorting end locations of the same sorting end location group, i.e. not distributed to different sorting end location groups. The second sorting plan assigns the same second sorting end location group to all those items of the second item type of which the sorting feature values likewise belong to this first value group. After this sorting pass exclusively items of the first item type are in the sorting end locations of the first sorting end location group and exclusively items of the second item type are in the sorting end locations of the second sorting end location group. The sorting feature values of the items in the first sorting end location group are also assumed by items of the second item type and in this case exclusively by items in a single second sorting end location group, not by items into two different second sorting end location groups. This is ensured by the embodiment with the subsets.

This embodiment makes it easier to feed the items to be sorted from the first sorting end location group and the items to be sorted from the second sorting end location group back to the sorting system for the last sorting pass synchronized as regards their timing. The embodiment makes it possible to output or pass to a machine controller the information about which sorting end locations belong to the first sorting end location group and which sorting end locations to the second sorting end location group.

The advantageous embodiment with the subsets thus makes it easier to feed back the items of the first item type from the first sorting end location group and the items of the second item type from the second sorting end location group in a synchronized manner to the suitable feeder device in each case and to adhere to predetermined general timing conditions when feeding back the items. These general conditions can result from different processing speeds of the different feed devices for example. If these general timing conditions are adhered to the items of the first sorting end location group and the items from the second sorting end location group are in the sorting system almost simultaneously in the next sorting pass. This makes it easier to unload items with the same sorting feature values and reduces the necessary memory space requirement.

Preferably the feeder device or each first feeder device operates as a singulator and automatically generates a flow of items spaced apart from one another of the first item type. The feeder device or each second feeder device feeds items of the second item type to the sorting system after these items have already been separated, for example manually by a worker. This removes the necessity of having to provide a singulator for the second item type as well. Even with relatively few items of the second item type it is often not worth having such a singulator. If the items of the second item type differ greatly in respect of physical characteristics, e.g. in respect of dimensions, surface property or specific weight, a singulator is often not capable of separating these items reliably with an adequate throughput. Therefore it is of advantage for each singulator to be tailored to items of the first item type.

Preferably each sorting end location which is used in at least one sorting pass is embodied so that the sorting end location optionally can accept items of the first item type or items of the second item type or items of both item types to be sorted without it being necessary to provide different types of sorting end locations or to operate the sorting end location in different modes. Preferably universal sorting end locations are thus used. This embodiment increases the flexibility of the sorting system because it does not need to be determined in advance which sorting end locations belong to the first sorting end location region and which sorting end locations to the second sorting end location region. Instead this can just be realized as late as possible and exclusively by adapting the sorting plans.

Furthermore it is made possible thanks to the invention, for a total of three sort passes, to use different first sorting end location regions and different second sorting end location regions in the two first sorting passes. In addition it is made possible, in consecutive sorting processes each with two sorting passes, to subdivide the sorting end locations differently into a first sorting end location region and a second sorting end location region respectively.

In a variation the sorting system possesses a set of universal sorting end locations which are capable of accepting items of both item types, and further sorting end locations which are only capable in each case of accepting items of one item type. In the last sorting pass only the universal sorting end locations are used, so that the remaining sorting end locations are available for other sorting tasks. In each preceding sorting pass further sorting end locations which are tailored to one type of item are able to be used for accepting items of this item type.

In each sorting pass the respective measuring device measures for each item the value that the sorting feature assumes for this item. In an embodiment the same measuring device is used in each sorting pass, which in each sorting pass measures once again for each item to be sorted the value that the sorting feature assumes for this item. In another embodiment the sorting feature value that the measuring device has stored in the first sorting pass for each item is stored at least temporarily. In each subsequent sorting pass the stored sorting feature value is determined for this item. The measuring device of the first sorting pass or another measuring device is capable of performing this determination.

In one embodiment in the first sorting pass the previously measured sorting feature value is attached to the item in machine-readable form, e.g. by a barcode being printed onto it. Or the sorting feature value read is written into a data memory which is attached to the item, e.g. into an RFID chip.

In one embodiment the item is provided with a unique code (ID code), e.g. by the code being printed onto the item itself or by a label with the code being stuck to the item. The code consists e.g. of alphanumeric characters or of a barcode or of both and can be decoded manually. Or the code is stored in a mobile data memory on the item, e.g. in an RFID chip. A data record for the item with this unique code is generated in a central database and stored. Since in the first sorting pass the measuring device has decoded the sorting feature value for this item, the data record for this item is supplemented by an encoding of the measured sorting feature value. In each subsequent sorting pass the unique code for the item is read and decoded, and a query to the central database with this code delivers the sorting feature value. It is also possible for the sorting feature value to have been determined already before the first sorting pass or to have been predetermined and also for the sorting feature value to be determined in the first sorting pass by the code being read and a query being directed to the central database with the read code.

In another embodiment, at least one optically-readable attribute, preferably a number of attributes, are predetermined in each sorting pass. In each sorting pass for each item to be sorted and for each attribute the value which this attribute assumes for this item is measured. In this way an attribute value vector is generated for each item in each sorting pass. In the first sorting pass for each item to be sorted a data record with the attribute value vector and the measured sorting feature value is generated and stored in each case. In each subsequent sorting pass an attribute value vector is measured once again for each item to be sorted and the data record with the stored attribute value vector of this item is determined by the current attribute value vector being compared to stored attribute value vectors. The sorting feature value of the dataset determined in this way is used in the sorting pass as the sorting feature value of the item. In order to determine the sorting feature value measured in the first sorting pass, the now measured attribute value vector is compared with stored sorting feature values, for which a search area is deliberately restricted to the stored attribute value vectors.

This embodiment with the attribute value vectors saves the step of printing information which describes the measured sorting feature value onto the item or of having to attach it in some other way. In particular this saves having to print an encoding of the measured sorting feature value onto the item to be sorted or of having to provide it with a mobile data memory. In this embodiment a first measuring device which measures the sorting feature and also a second measuring device which measures the optically-detectable attribute are used. The first measuring device for the sorting feature is only used in the first sorting pass, the second measuring device for the attribute in each sorting pass. In this embodiment too the sorting feature value is only measured in the first sorting pass and then determined in another way.

In one embodiment the same sorting system consecutively performs two inventive sorting processes for different sets of items to be sorted. In this case the same sorting system carries out at least two sorting passes in each sorting process. In the first sorting process in one embodiment the numerical ratio between items of the first item type and items of the second item type is different than in the second sorting process. This is taken into account in the embodiment by a different first sorting end location region and/or a different second sorting end location region being used in the first sorting process from that used in the second sorting process. The first sorting end location region in the first sorting process consists of more or of fewer sorting end locations than the first sorting end location region in the second sorting process. This adaptation is preferably realized by the first sorting plans and the second sorting plans being adapted to the respective numerical ratio of items of the first item type to items of the second item type.

In one embodiment a fixed region of the sorting system belongs to each sorting end location. For example the fixed region is a support surface or a holder for a tray or another receptacle, which is capable of accepting items which are unloaded into this sorting end location. The tray is placed on the fixed area and filled with those items to be sorted which the current sorting plan employed assigns to this fixed area. A filled receptacle on or at the fixed area can be replaced by an empty receptacle.

In another embodiment the sorting system possesses a number of receptacles for items and one, preferably several, transfer points. During each sorting pass the sorting system brings each item into a transfer point in each case and moves the receptacles relative to the transfer points. For example a conveyor system transports a tray open at the top away below these transfer points. As soon as a receptacle is located in a transfer position in relation to a transfer point an item can be brought from the transfer point into the receptacle, e.g. by the item sliding from the transfer point downwards into the receptacle. The sorting system selects for an item, depending on the measured sorting feature value, an available receptacle and brings the item from a transfer point into this selected receptacle. In one embodiment each sorting plan assigns the sorting feature values to positions of receptacles on this conveyor system.

Preferably the sorting system additionally moves at least one reserve receptacle likewise relative to these transfer points, wherein a reserve receptacle is not able to be selected. As soon as a selectable receptacle is filled, this filled receptacle is replaced by an empty receptacle. In addition a reserve receptacle is made into a selectable receptacle, wherein in the sorting plan those sorting feature values to which the position of the tray just filled was assigned are assigned to this other receptacle. The empty receptacle just unloaded becomes a reserve receptacle. This means that for each item in a transfer point, even in the period in which the filled receptacle is being replaced by an empty receptacle, a selectable receptacle is available. In the sorting plan an identification of the filled receptacle is replaced by an identification of the previous reserve receptacle. The reserve receptacles do not occur in the sorting plan.

In one embodiment the sorting system additionally possesses a transfer pocket unit with a number of transfer pockets for accepting and outputting at least one item in each case. A number of transfer points belong to this transfer pocket unit. The sorting system is capable of emptying a transfer pocket and of doing this independently of the other transfer pockets wherein all items from this transfer pocket are brought into a sorting end location. For example all items slide from the transfer pocket down into a tray which is located in a transfer position in relation to the transfer pocket.

This embodiment is especially advantageous for sequence sorting, in which a sequence is predetermined between the possible or at least the sorting feature values which occur and the items which are to be sorted in accordance with this sequence, so that after the sorting in the sorting end locations a sequence of sorted items will have been created. In each sorting end location a sequence of items is created which are sorted per se in accordance with this predetermined sequence of sorting feature values. In addition the sorting end locations themselves are arranged in a specific sequence. This sorting task occurs for example when postal items (letters or packages) are to be sorted in accordance with their delivery addresses, so that thereafter a carrier can quickly deliver these postal items sorted according to delivery address when this carrier walks or drives a delivery route with reference to the delivery addresses. For example in this delivery route sorting of postal items significantly more different sorting feature values (here: delivery addresses) occur than the sorting system has different sorting end locations. If two sorting passes are performed and in the first sorting pass a total of N1 sorting end locations are used and in the second sorting pass N2 sorting end locations, then the sorting system is capable of sorting on N1*N2 different sorting feature values.

Thanks to the transfer pockets the sorting system is capable of sorting on even more different sorting feature values without an additional sorting end location being needed and without an additional sorting step being required. The sorting feature values are combined into value groups. Each value group consists of at least one sorting feature value and at least one value group comprises a number of sorting feature values. Each sorting plan assigns each value group a sorting end location in each case and thus all sorting feature values of this value group to the same sorting end location. All items of which the sorting feature values belong to the same value group are unloaded in each sorting pass into the same sorting end location in each case. Each sorting end location is able to be moved relative to the transfer pockets and thus is able to be brought into a transfer position in each case relative to each transfer pocket.

At least in the last sorting pass the following sequence is performed for each item—or at least for all items of which the sorting feature values all belong to the same value group: The items are distributed to the transfer pockets depending on their sorting feature values. For example the items are distributed so that two items of two different sorting feature values are always brought into two different transfer pockets. The transfer pockets are subsequently emptied in turn. During this emptying all items are brought from this transfer pocket into a sorting end location. Because a sequence is adhered to during emptying of the transfer pocket, in each sorting end location into which items are brought from the transfer pockets, a sequence among elements is also established. If items are emptied consecutively from different transfer pockets into the same sorting end location, then this emptying sequence establishes a sequence among items in the sorting end location.

Preferably in the first sorting pass a count is undertaken for each sorting feature value as to how many items with this sorting feature value are to be transported. In particular it is established in the first sorting pass which sorting feature items actually occur among the items to be sorted, i.e. which sorting feature items have a count 1. In the last sorting pass, for each sorting feature value actually occurring, a check is made at least once as to whether all items with this sorting feature value have been fed to the sorting system. As soon as all items with this sorting feature value have been fed to the sorting system the step is triggered that these items are unloaded into such a sorting end location as the sorting plan assigns to this sorting feature value for the last sorting pass.

In one embodiment the sorting plans are embodied so that there is at least one value group with a number of sorting feature values which has the following characteristic: Each sorting plan assigns the same sorting end location in each case to all sorting feature values of this value group. Different sorting plans can assign different sorting end locations to these sorting feature values of the value group to, but one sorting plan assigns the same sorting end location to all sorting feature values. In this embodiment the unloading of the items with sorting feature values of this value group is then begun in the last sorting pass when it is established that each item with a sorting feature value of this value group has been fed to the sorting system. This embodiment shortens the time needed for the last sorting pass.

In one embodiment each sorting feature value of an item is an identifier of a destination point to which this item is to be transported. This destination point identifier is attached to the item itself in one embodiment. Or the item possesses a unique code and a data record with this code and with an encoding of the destination point identifier is stored in a central database.

The invention is described below with reference to an exemplary embodiment. In the figures:

DESCRIPTION OF THE INVENTION

In the exemplary embodiment the invention is used in a sorting system which processes postal items (letters, flats, catalogs, periodicals, postcards and the like) of different dimensions. In an embodiment the standard postal items are flat postal items and the special postal items are parcels and packages.

Each postal item is to be transported to a predetermined destination address. This destination address is defined by the name of the recipient and also by a postal address or by geo-coordinates. Each postal item is provided either with an identifier of this predetermined destination address (recipient name and postal address).

Or a quantity of similar and non-addressed postal items are transported to the sorting system. In addition a list able to be evaluated by a computer with destination address identifiers is transmitted to the sorting system. During the sorting the sorting system automatically selects for each similar and not-yet-addressed postal item a destination address identifier in each case from the transmission list, deletes it from the list and assigns this selected destination address identifier to the postal item. In one embodiment the sorting system prints the selected destination point identifier on the not-yet-addressed postal item.

It is possible for both addressed and also non-addressed postal items to be sorted by the same sorting system in one sorting process.

Figure 1:
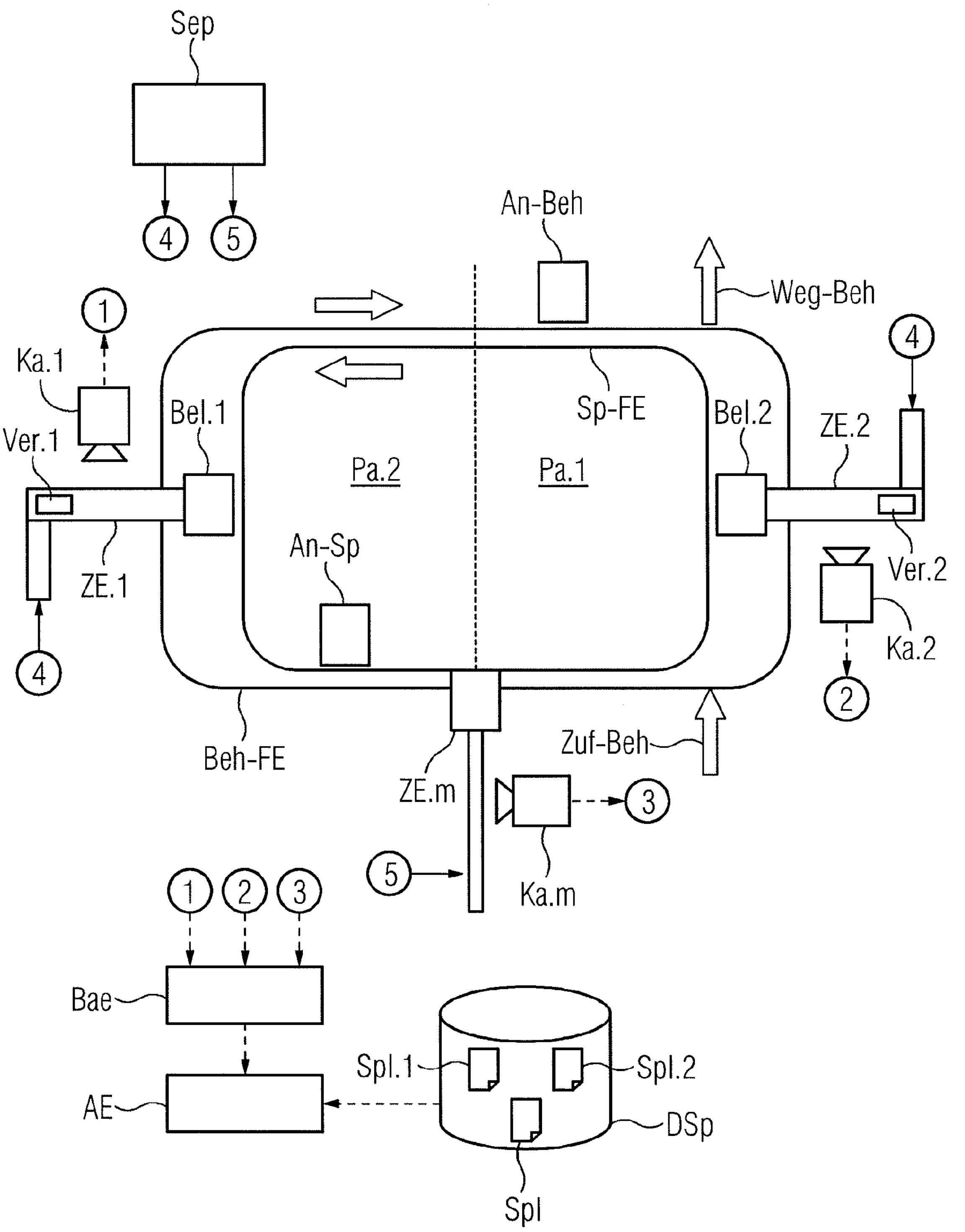
FIG. 1 shows a schematic of the sorting system of the exemplary embodiment, viewed from above.

FIG. 1 shows a schematic of the sorting system of the exemplary embodiment, viewed from above. In the exemplary embodiment this sorting system comprises the following components:

- A format separator Sep,
- At least two feeders ZE.1, ZE.2 operating in parallel, each with a singulator Ver.1, Ver.2,
- A manual input unit ZE.m,
- At least one, preferably two, horizontal cameras Ka.1, Ka.2,
- A vertical camera Ka.m,
- An image evaluation unit Bae,
- A data memory DSp with a single sorting plan Spl able to be executed by a computer for the last sorting pass and a first sorting plan Spl.1 and a second sorting plan Spl.2 respectively for each preceding sorting pass,
- A data-processing selection unit AE,
- At least one loading station, preferably a loading station Bel.1, Bel.2, Bel.m for each feeder ZE.1, ZE.2, ZE.m,

- A plurality of movable holder facilities in the form of storage pockets,
- A storage pocket conveyor device (pocket carousel) Sp-FE with a guide device for the plurality of movable holder facilities,
- At least one drive An-Sp for the holder facilities of the storage pocket conveyor device Sp-FE,
- A fixed transfer pocket unit with a plurality of fixed transfer pockets,
- In one embodiment a plurality of trays, open at the top, on a tray conveyor device Beh-FE, wherein each tray accommodates a number of postal items in each case,
- A tray conveyor device Beh-FE with an endless conveyor belt, on which the trays stands, and which transports the trays along a closed conveyor path,
- Whereby the endless conveyor path is subdivided into a plurality of tray positions,
- A drive An-Beh for the endless conveyor belt on which the trays stand,
- A feeder conveyor device Zuf-Beh for empty trays
- An unloading conveyor device Weg-Beh for filled trays. Stored in data memory DSp are
- A single sorting plan Spl able to be executed by a computer for the last sorting pass and
- A standard sorting plan Spl.1 able to be executed by computer and a special sorting plan Spl.2 able to be executed by a computer for each preceding sorting pass.

Thus, for n sorting passes, n−1 standard sorting plans and n−1 special sorting plans are stored. Each standard sorting plan functions as a first sorting plan, each special sorting plan as a second sorting plan.

Each holder apparatus is capable of accommodating and transporting one flat postal item in each case such that the postal item is held in an almost vertical position and transported and cannot fall out of the holder apparatus. The holder apparatus is either embodied as a storage pocket with two parallel side edges or as a clamping arrangement with at least one clamp.

Figure 2:
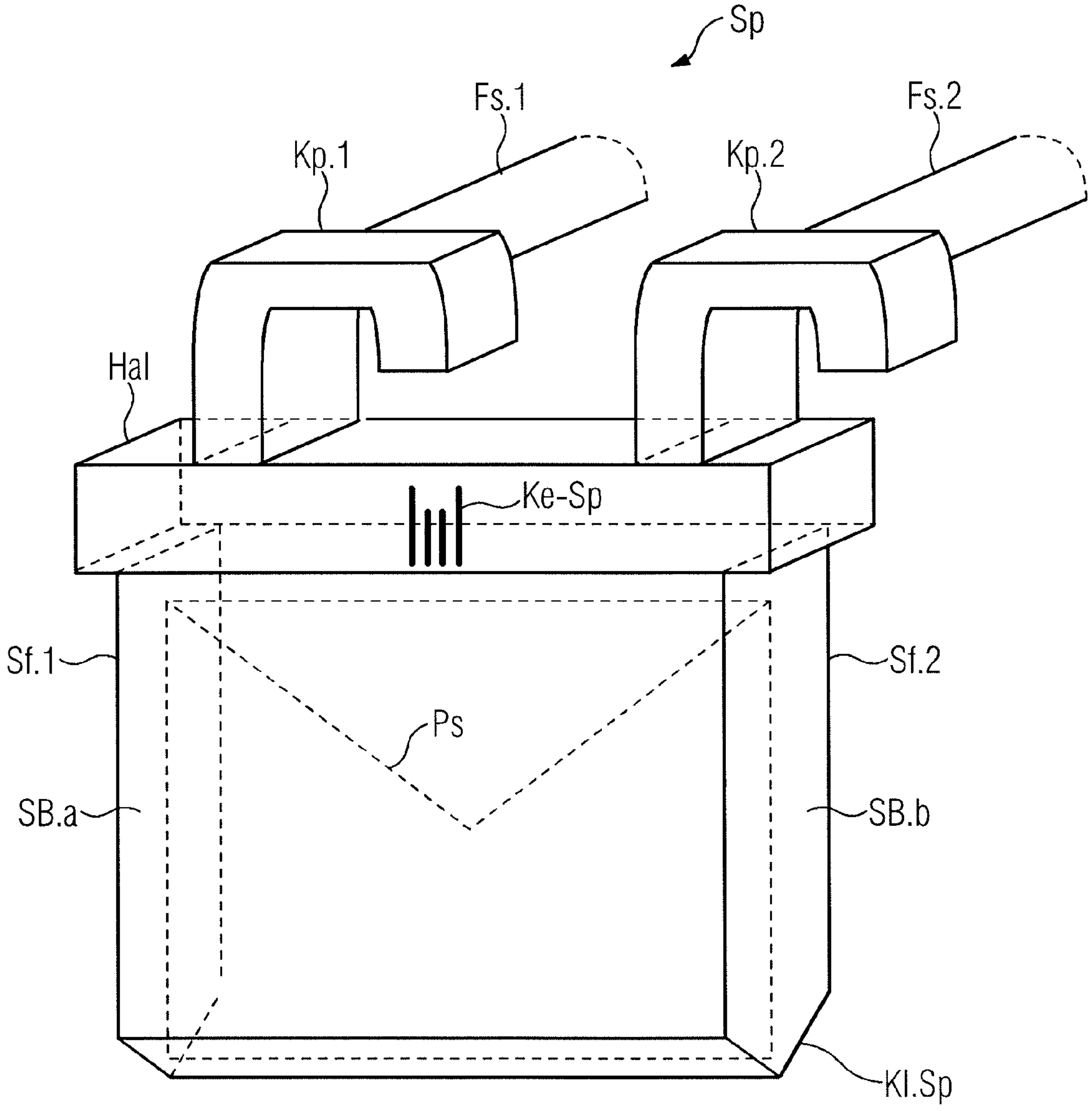
FIG. 2 shows a schematic of a holder facility in the form of a storage pocket.

FIG. 2 shows a schematic of a holder apparatus in the form of a storage pocket without its own drive. This storage pocket Sp has two coupling elements Kp.1, Kp.2. These coupling elements Kp.1, Kp.2 slide along two parallel guide rails Fs.1, Fs.2 and have the form of two hooks for example. The storage pocket Sp hangs on these two guide rails Fs.1, Fs.2. The storage pocket Sp possesses two flat side surfaces Sf.1, Sf.2 as well is two lateral delimitation elements SB.a, SB.b and a floor with a flap Kl.Sp. The two parallel side surfaces Sf.1, Sf.2 enclose a space in which the storage pocket Sp holds a flat postal item Ps. The postal item Ps is able to be pushed from the side between the two side surfaces Sf.1, Sf.2 of the storage pocket Sp. A hingeable flap Kl.Sp in the floor of the storage pocket Sp holds the postal item in the storage pocket in its closed state. If the flap Kl.Sp is opened, the postal item slides downwards from the storage pocket Sp under the force of gravity.

The two side surfaces Sf.1, Sf.2 hang on a holder Hal. This folder Hal for its part hangs on the two coupling elements Kp.1, Kp.2. A machine-readable code Ke-Sp is attached to the holder Hal in the embodiment of FIG. 2. This code Ke-Sp differentiates this storage pocket Sp from all other storage pockets of the sorting system.

In the exemplary embodiment the holder apparatuses do not possess their own drive. The central drive An-Sp for the holder apparatuses moves the holder apparatuses by means of a transmission unit. For example the holder apparatuses slide along a guide device of the pocket carousel, e.g. along the two guide rails Fs.1, Fs.2, and are pulled by means of a chain. Each holder apparatus is thus transported along a conveyor path, in the exemplary embodiment along a closed conveyor path, in a transport direction. This transport direction does not change during the guided transport. Preferably the transport speed with which the storage pockets are transported also remains constant.

The item plane of the transported postal items and the side surfaces of the storage pockets stand in the exemplary embodiment almost constantly at right angles to the transport direction. This vertical alignment saves space during transportation, since the filled storage pockets, viewed in the transport direction, need far less space than in another alignment. With holder facilities with clamps the item planes of the transported postal items also preferably stand at right angles to the transport direction.

The guide device preferably has one rail or two rails, and each holder apparatus comprises one coupling point per rail in each case to couple the holder apparatus to this rail. The two parallel guide rails Fs.1, Fs.2 that are indicated in FIG. 2 belong to the guide device.

Each loading station Bel.1, Bel.2, Bel.m is embodied to push a postal item which is fed to the loading station standing upright from the side or from above into a holder apparatus or to connect to the holder apparatus in another way. Preferably each postal item is pushed into a holder apparatus in the form of a storage pocket while the holder apparatus is being moved past the loading station Bel.1, Bel.2, Bel.m. A rotatable supported insertion part (loading arm) of the loading station temporally holds the upright postal item and is moved by a distance parallel to the transport apparatus of the holder apparatus so that only a slight relative speed between the holder apparatus and the insertion part with the postal item arises.

In the exemplary embodiment the two loading stations Bel.1, Bel.2 load holder apparatuses with standard postal items, after these standard postal items have been transported from a feeder device ZE.1, ZE.2 to a loading station Bel.1, Bel.2. The loading station Bel.m loads holder apparatuses with special postal items after the special postal items have been transported from the feeder device ZE.m to the loading station Bel.m.

Preferably each movable holder device (storage pocket or clamp arrangement) only accommodates one postal item at any given time. It is possible for the same holder apparatus to accept a number of postal items one after the other.

Each holder apparatus in the form of a storage pocket has an unloading mechanism on its floor, i.e. a flap. In the open position of the unloading mechanism the postal items slides downwards out of the holder apparatus. A clamp can be opened and then releases a postal item.

In one embodiment all holder apparatuses are similar and each holder apparatus is capable of accepting each postal item. Each holder apparatus is capable of optionally accepting a standard postal item or a special postal item. In another form of embodiment there are two types of holder apparatus, namely one type for standard postal items and one type for special postal items.

The pocket carousel with the moving holder apparatuses is attached in a plane above the transfer pocket unit with the transfer pockets. The fixed transfer pockets (transfer pockets) are therefore in a plane below the pocket carousel. Preferably all transfer pockets are arranged in the same plane.

Preferably each transfer pocket is likewise embodied as a storage pocket. This storage pocket has a lower and a higher sidewall. The higher sidewall is inclined at an angle to the vertical. Seen in the transport direction in which the holder apparatuses are moved relative to the fixed transfer pockets, the higher side wall is the front side wall of the transfer pocket.

Each transfer pocket is capable of accepting a number of postal items at once and likewise has an unloading mechanism. In the open position of the unloading mechanism the postal items slide downwards out of this transfer pocket. Each unloading mechanism and thus each transfer pocket can be opened and closed separately.

The conveyor path of the pocket carousel moves past each fixed transfer pocket. The drive An-Sp of the pocket carousel transports the storage pockets along this closed conveyor path of the pocket carousel. Therefore each holder apparatus can be brought into a transfer position in relation to each transfer pocket. In this transfer position a postal item can slide downwards out of the holder apparatus into the transfer pocket. The postal item sliding downwards strikes against the higher side wall of the transfer pocket and then slides down into the transfer pocket.

The sorting end location arrangement comprises a horizontal conveyor system Beh-FE, which transports trays in a direction along a closed conveyor path. In one embodiment each sorting end location is a section of this horizontal conveyor system. Separation elements divide the horizontal endless conveyor belts of the conveyor system Beh-FE into such sections.

In another embodiment the horizontal conveyor system Beh-FE is capable of transporting a plurality of trays along the closed conveyor path, wherein the trays stand on the horizontal conveyor system Beh-FE and are open at the top. Each tray position on the horizontal conveyor system functions as a sorting end location in each case. Each sorting plan assigns the sorting feature values (here: the destination addresses) of such tray positions and not for example tray IDs. The horizontal conveyor system and the trays are to be found below the fixed transfer pocket unit.

The horizontal conveyor system Beh-FE is capable of bringing each tray into a transfer position in relation to each transfer pocket. In this transfer position the postal item or the postal items can slide downwards out of the transfer pocket into the tray and then lie horizontally in the tray.

Figure 3:
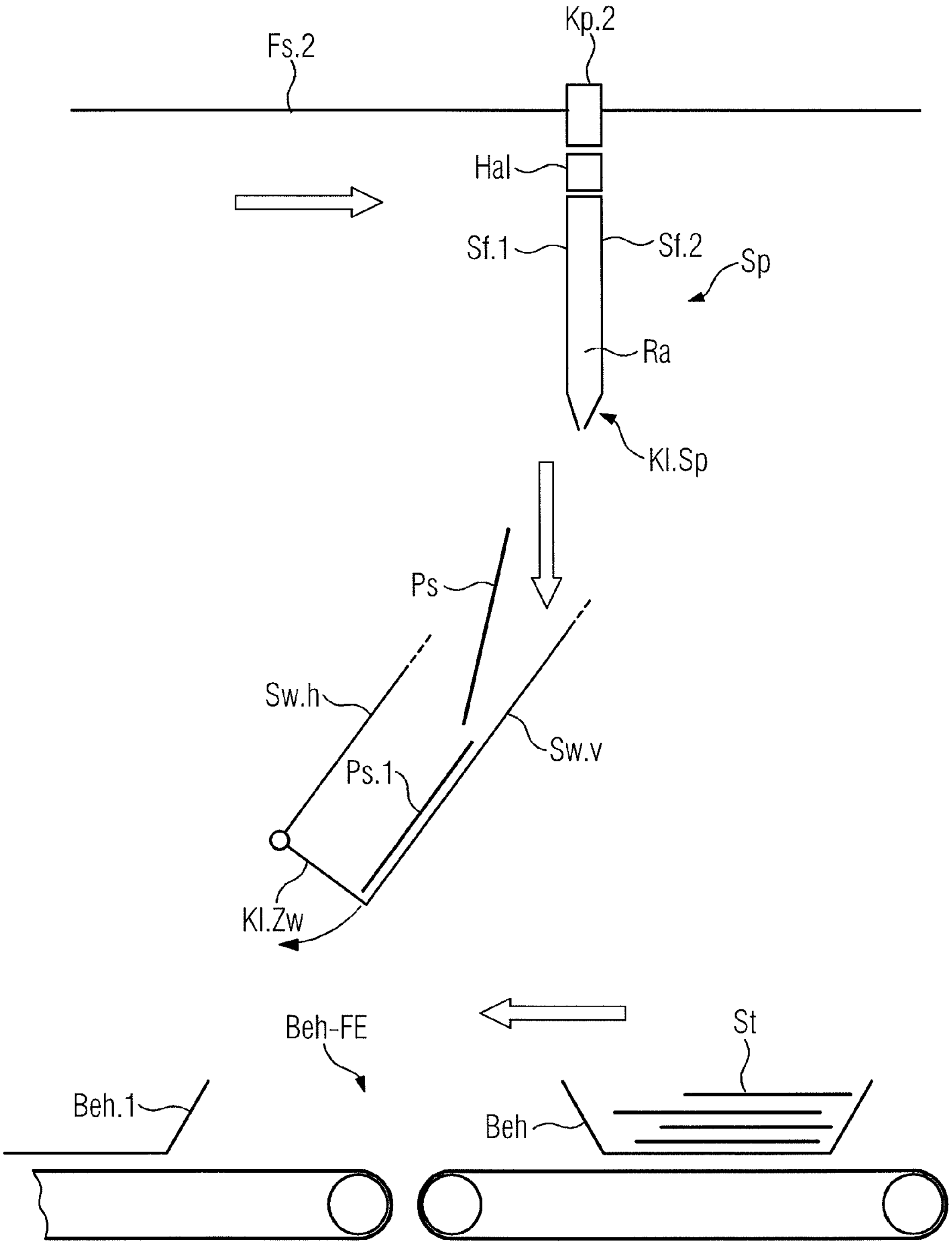
FIG. 3 shows a schematic of the process of how a postal item gets from a storage pocket into a fixed transfer pocket and from this fixed transfer pocket into a tray.

In the exemplary embodiment which FIG. 3 illustrates, the transfer pocket unit is embodied in a fixed location. The storage pockets and also the trays are moved and this is done in the exemplary embodiment in opposite directions. In a variation the transfer pocket unit is also movable and this movable transfer pocket unit is moved relative to the trays. It is also possible for both the transfer pocket unit and also the trays to be moved and for this preferably to be done in opposite directions of transport from one another. In each version of the exemplary embodiment each tray can be brought into a transfer position in relation to each transfer pocket used, so that postal item can be brought from each transfer pocket into each tray.

FIG. 3 illustrates schematically how a postal item Ps slides downwards out of a moving storage pocket Sp into a fixed transfer pocket ZwSp and out of this transfer pocket ZwSp downwards into a tray Beh. In the example of FIG. 3 two trays Beh, Beh.1 are transported by the horizontal conveyor belt Beh-Fb. The postal item Ps is to be laid on a stack St of horizontal postal items already formed in the tray Beh. The trays Beh, Beh.1 are transported in the opposite direction to the storage pocket Sp, this being indicated in FIG. 3 by two arrows.

The fixed transfer pocket ZwSp—seen in the transport direction of storage pockets—has a higher front side wall Sw.v and a lower rear side wall Sw.h. The transfer pocket ZwSp is inclined against the vertical such that the higher front side wall Sw.v is the bottom side wall.

In the situation that FIG. 3 shows the flap Kl.Sp of the storage pocket Sp is opened. The postal item Ps sliding out of the storage pocket Sp describes a flight path which is brought about by an overlaying of the kinetic energy because of the transport of the postal item in the storage pocket Sp and gravity, and strikes the front side wall Sw.v or a postal item Ps.1 which is already resting on the front side wall Sw.v. The flap Kl.Zw of the fixed transfer pocket ZwSp is still closed. As soon as this flap Kl.Zw is opened, the postal items Ps, Ps.1 slide downwards out of the transfer pocket ZwSp into the tray Beh.

Each singulator Ver.1, Ver.2 of the parallel-operating feeders ZE.1, ZE.2 is embodied to separate a stack of upright flat postal items, which are fed to the singulator. A stream of postal items transported standing upright and spaced apart from one another leaves the singulator.

The manual input ZE.m is capable in each case of drawing in and transporting away a single flat postal item. Preferably the manual input ZE.m includes a horizontal conveyor belt, on which a flat postal item is laid and transported away. In one embodiment the postal item is clamped in the horizontal position between two horizontal conveyor belts or a horizontal conveyor belt and at least one roller and transported away.

An alignment unit of the manual input ZE.m aligns a previously horizontal postal item into a vertical position. In one embodiment the alignment unit has a conveyor belt turned into itself. In another embodiment a number of plates following one another with different angles of inclination align the individually fed postal items.

Each singulator Ver.1, Ver.2 achieves a far higher throughput than the at least one manual input ZE.m.

A distinction is made between two types of postal items, namely standard postal items and special postal items. This predetermines the distinction about which postal items the at least two singulators Ver.1, Ver.2 operating in parallel are capable and not capable of separating. Those postal items which each singulator Ver.1, Ver.2 is capable of separating are referred to and handled as standard postal items, the remaining postal items as special postal items.

The special postal items are fed to the sorting system by means of the or by means of a manual input ZE.m and in the exemplary embodiment are separated manually by a worker before feeding. For example the worker takes the special postal items out of a tray one after the other and lays a special postal item on a horizontal conveyor belt of the manual input Ze.m. It is also possible to use an automatic handler or another device which grasps each special postal item in turn and feeds it to the manual input ZE.m.

In the exemplary embodiment a postal item is a standard postal item if each dimension of the postal item falls within a predetermined range in each case; otherwise it is a special postal item. It is possible for a postal item to also be a special postal item if the postal item consists of a letter in a sleeve or when the outline contour of the postal item in the item plane is not a rectangle.

In the exemplary embodiment the singulators Ver.1, Ver.2 are capable of separating letters (standard letters up to format C4) as well as regular flats, and therefore the letters and the flats belong to the standard postal items.

The optional format separator Sep is capable of dividing a stream of fed postal items into a stream of standard postal items and a further stream of special postal items. For example the format separator comprises a number of slots. A standard postal item slides through such a slot, a special postal item does not. The slots are for example arranged on the circumferential surface of a drum or between two vertical or angled endless conveyor belts.

Preferably the manual input ZE.m is embodied so that it is capable of feeding each flat postal item, i.e. both a special postal item and also a standard postal item. Therefore the format separation is carried out so that it is ensured that only standard postal items reach the singulator Ver.1, Ver.2. Account is taken of the fact that individual standard items arrive at the manual input ZE.m.

The sorting system is used to accurately sort a quantity of postal items on delivery sequence. This quantity of postal items are those postal items to be sorted which reach the sorting system at a predetermined point in time. Each postal item of the quantity is to be transported to a delivery address in a predetermined delivery area.

A sequence is predetermined among the postal addresses (delivery points) of this delivery area. A carrier drives or goes to each postal address of this delivery area. In this case the carrier adheres to the predetermined sequence (carrier walk sequence) among the delivery points. The delivery sequence is embodied for example so that as short as possible a distance is covered to reach all delivery points of the delivery sequence.

The delivery sequence is divided into a number of predetermined part delivery sequences. After sorting there should be a quantity of postal items in each tray of the sorting system in each case which are sorted in accordance with this part delivery sequence. In the exemplary embodiment the sorting system decides automatically during sorting on the number of trays to which the postal items to delivery points of a part delivery sequence are to be distributed.

The sorting system has fewer sorting end locations than there are postal addresses in the delivery area. In order to sort the postal item in accordance with the delivery sequence despite this without pre-sorting being necessary the sorting system carries out a number of sorting passes (n-pass sequencing) with $n \geq 2$.

Before the first sorting pass the format separator device Sep separates the postal items to be sorted from the quantity of items into the quantity of standard postal items and into the quantity of special postal items. At least one stream of standard postal items leaves the format separator device Sep and is divided into a number of streams in order to bring about an even utilization of the singulators Ver.1, Ver.2. A stream of standard postal items reaches each singulator Ver.1, Ver.2 in each case. The special postal items are transported lying down to the manual input ZE.m.

It is naturally also possible for a worker to manually sort out the special postal items from a stream of fed postal items.

In each sorting pass the following steps are performed for each standard postal item:

- The postal item is fed as part of a stack or another quantity of postal items to a feeder device ZE.1, ZE.2. The postal item passes through the singulator Ver.1, Ver.2 of this feeder device ZE.1, ZE.2 and exits from this feeder device separated and in an upright position.
- The postal item is transported in an upright position past a horizontal camera Ka.1, Ka.2. Each horizontal camera Ka.1, Ka.2 creates in each case an image of a surface of the postal item which can be evaluated by a computer. If the postal item was fed to the feeder device Ze.1, Ze.2 in the correct orientation then the image from the camera Ka.1, Ka.2 shows the delivery address identifier on a surface of the postal item.
- It is also possible for the sorting system to have two horizontal cameras per feeder device Ze.1, Ze.2, i.e. a total of four horizontal cameras. Therefore the sorting system creates an image of each postal item which shows the delivery address regardless of how the postal item is oriented when it is fed in.
- The postal item is transported in an upright position to a loading station Bel.1, Bel.2.
- The loading station Bel.1, Bel.2 pushes the postal item into a previously empty holder apparatus of the pocket carousel.
- The image evaluation unit Bee evaluates this image with the delivery address identifier, in order to automatically decode the delivery address identifier by Optical Character Recognition (OCR).
- If the image evaluation unit Bae is not capable of automatically decoding the delivery address identifier, the image is displayed on a screen device of a video encoding station. A worker reads the delivery address identifier in the image shown and enters its read result, e.g. by means of the keyboard or by means of voice input. While the delivery address is decoded by OCR or by video encoding, the postal item is transported into a storage pocket.
- The evaluation unit AE automatically selects a sorting end location for the postal item. For this the selection unit AE applies a sorting plan able to be executed by a computer for this sorting pass to the decoded destination address identifier of this postal item. This sorting plan assigns a sorting end location group to each delivery address identifier in each case.
- The selection unit AE, by applying the sorting plan, selects a currently available sorting end location of this sorting end location group.
- Depending on this selection of an available sorting end location, the selection unit AE selects a fixed transfer pocket. The selection unit AE, after selecting a sorting end location, selects the transfer pocket so that a postal item remains for as short a time as possible in this transfer pocket, until it can be brought into a tray. Through this the transfer pocket is quickly made available again for other postal items.
- The drive An-Sp of the pocket carousel transports the holder apparatus Sp with the postal item far enough along the closed conveyor belt Sp-FE for the holder apparatus to be in a transfer position in relation to the selected fixed transfer pocket.
- The holder apparatus is opened and the postal item slides into the transfer pocket.
- The horizontal conveyor system Beh-FE brings the selected sorting end location (here: the tray at the selected tray position) into a transfer position in relation to the selected transfer pocket.
- The transfer pocket is opened and all postal items from the transfer pocket slide into or onto the selected sorting end location.

This concludes the sorting pass for this standard postal item.

The following steps are carried out for each special postal item:

- The special postal item is fed individually to the manual input ZE.m so that the delivery address identifier points downwards.
- The manual input ZE.m transports the horizontal postal item past an opening.
- The vertical camera Ka.m creates an image able to be evaluated by a computer in a direction of view at right angles upwards through the opening. Because the postal item is lying down, the distance between the lower surface of the postal item and thus the delivery address identifier and the vertical camera Ka.m is always the same regardless of how big the postal item is—i.e. in the lying position of the postal item: regardless of how tall the postal item is. It is not necessary to continuously adjust the focus of the vertical camera during the sorting.

The special postal item is aligned into a vertical position and transported onto the loading station Bel.m.

The loading station Bel.m brings the postal item into a previously empty holder apparatus.

Subsequently the same steps are performed as for a standard postal item.

As already explained, the sorting system possesses a plurality of sorting end locations. In the exemplary embodiment the sorting end locations are embodied as tray positions on the horizontal conveyor system or as sections of this horizontal conveyor system Beh-FE. Each tray or each section can be filled with postal items up to a predetermined maximum filling height. A sorting end location (tray position) is then currently available for a transfer pocket when the tray is still capable of accepting all postal items from this transfer pocket, without the predetermined maximum filling height being exceeded, and otherwise is not currently available.

In order to select a sorting end location in a sorting pass for a postal item, the data-processing selection unit AE automatically applies a sorting plan for this sorting pass to the measured destination point identifier of the postal item and through this determines the assigned sorting end location group. This sorting end location group consists of an identifier of a sorting end location or the identifiers of a number of sorting end locations. From this determined sorting end location group the selection unit AE then selects a currently available sorting end location. The selection unit AE selects a tray position of a tray not yet completely filled and therefore available and not a specific tray.

A filled tray is transported to an output of the horizontal conveyor system and is then transported away by the removal conveyor device Weg-Beh. In addition the feeder device Zuf-Beh continues to bring empty trays onto the conveyor system Beh-FE. At any given point in time each sorting end location group therefore includes an identifier of a currently available tray position.

At any given point in time—in addition to those trays of which the positions appear in the applied sorting plan—there are empty trays as reserve sorting end locations on the horizontal conveyor system Beh-FE. If a tray is filled and cannot accept any further postal items, then in each sorting plan currently being used its tray position is replaced by the tray position of the empty tray, so that this tray is no longer a reserve sorting end location, but is now able to be selected and accepts postal items. That empty tray that replaces the filled tray now functions as the new reserve sorting end location, so that the number of reserve sorting end locations always remains the same, but their positions change however.

In the first sorting pass M sorting end locations (in the exemplary embodiment: tray positions) are used, in the second sorting pass N sorting end locations. It is possible that in both sorting passes the same M=N sorting end locations will be used.

The M sorting end locations which are used in the first sorting pass are logically divided into two regions:

A standard region with M(1) sorting end locations for the standard postal items and A special region with M(2) sorting end locations for the special postal items.

M(1)+M(2)=M and M(1)>M(2) applies. The standard postal items function as the items of the first item type, the special postal items as the items of the second item type. The standard region functions as the first sorting end location region, the special region as the second sorting end location region. Each standard sorting plan functions as a first sorting plan, each special sorting plan as a second sorting plan.

The total of M sorting end locations of these two regions do not differ physically from one another in the exemplary embodiment. The standard region accepts the standard postal items in the first sorting pass, the special region accepts the special postal items. Each sorting end location region includes a set of positions for one tray in each case.

In the exemplary embodiment only one type of tray is used. Each tray is capable of accepting both standard postal items and also special postal items. Each tray on the horizontal conveyor system Beh-FE has a specific tray position on this conveyor system. This tray position occurs in a currently used sorting plan unless this tray currently functions as a reserve sorting end location.

If more than two sorting passes are performed, for each sorting pass except for the last sorting pass the sorting end locations used in each case are divided into two regions, namely into a standard region and into a special region.

If three sorting passes are performed then M1 sorting end locations of the first sorting pass are divided into M1(1) sorting end locations for the standard postal items and M1(2) sorting end locations for the special postal items. The M2 sorting end locations of the second sorting pass are divided into M2(1) sorting end locations for the standard postal items and M2(2) sorting end locations for the special postal items. M1(1)+M1(2)=M1, M1(1)>M1(2), M2(1)+M2(2)=M2 und M2(1)>M2(2) applies.

This subdivision is a purely logical subdivision which is undertaken exclusively by a corresponding embodiment of the sorting plans. Physical adaptation or modification is not required.

In the last sorting pass no distinction is made between the sorting end locations used and therefore the sorting end locations are not logically subdivided into a number of regions.

As illustrated above the selection unit AE selects a sorting end location in each case for each postal item in that the selection unit AE applies a sorting plan to the decoded destination point identifier of the postal item. A dictionary with valid postal addresses is additionally used for the selection. This dictionary assigns to each valid postal address a sorting code. In the USA this sorting code is an 11-digit ZIP Code and designates for example an individual suite of an office building. The address reader finds a valid address in the dictionary (or also does not do so) and determines that sorting code to which this found valid address is assigned. Each sorting plan assigns the sorting codes occurring at least one sorting end location. The selection unit selects the sorting end location which is assigned to the sorting code of the decoded destination point identifier.

In the first sorting pass two different sorting plans able to be evaluated by a computer are used, namely a standard sorting plan for the standard postal items and a special sorting plan for the special postal items. Both sorting plans assign to each delivery address (more precisely: each sorting code) a sorting end location group in each case. Because this sorting system has fewer sorting end locations than there are delivery addresses, each sorting plan assigns the same sorting end location group to all sorting feature values of a value group. Each value group identified in a sorting plan consists of at least one delivery address identifier, as a rule of a number of delivery address identifiers. Each sorting end location group consists of the identifier of at least one sorting end location (tray position), preferably of at least two different sorting end locations.

The standard sorting plan assigns to each delivery address one sorting end location group of the first sorting end location region in each case, i.e. at least one sorting end location of the M(1) different sorting end locations of the first region. The special sorting plan assigns to each delivery address in each case a sorting end location group from the second sorting end location region, i.e. at least one of M(2) different sorting end locations.

Figure 4:
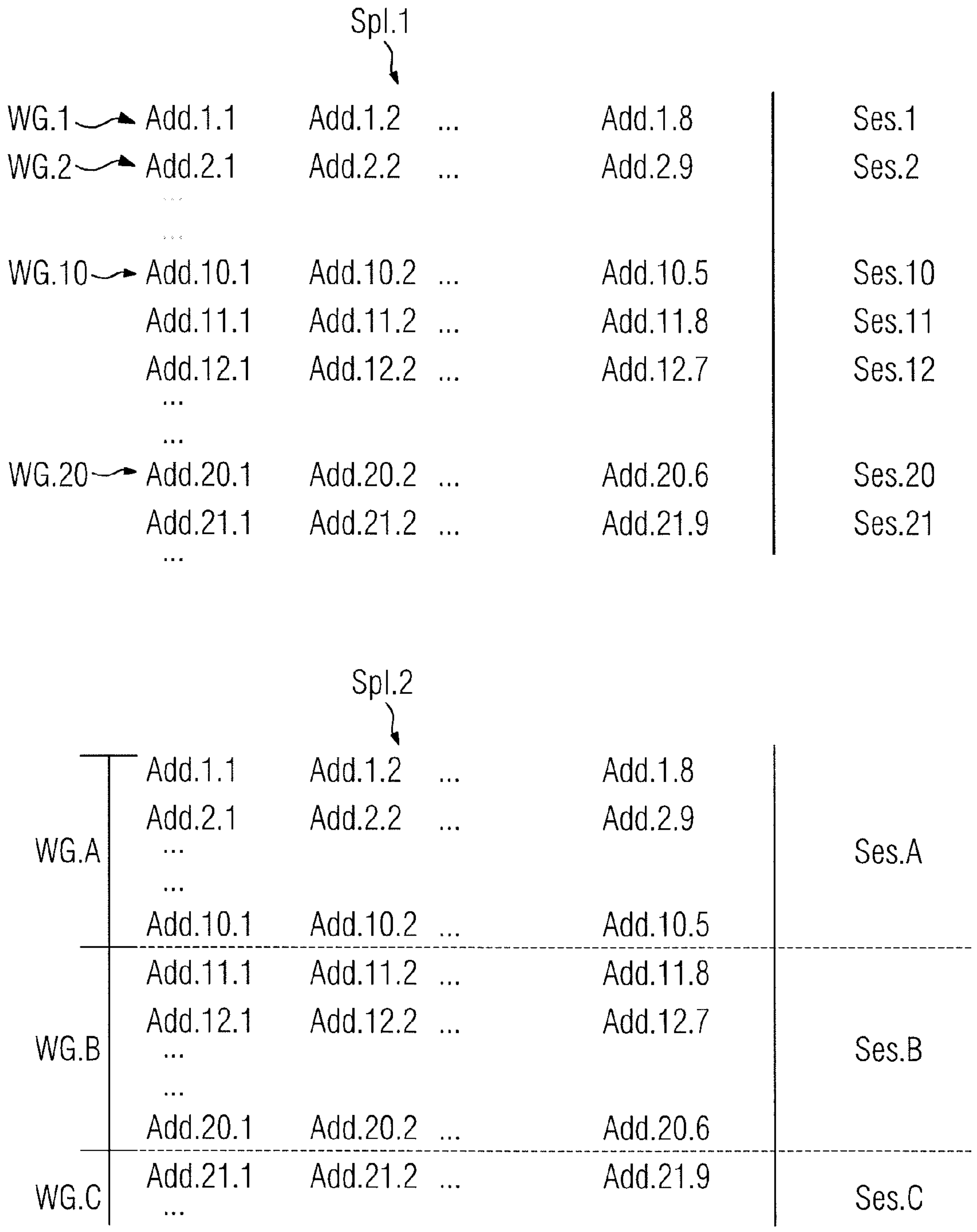
FIG. 4 shows an example of a first sorting plan and the second sorting plan.

FIG. 4 shows an example of a first sorting plan (standard sorting plan) Spl.1 and a second sorting plan (special sorting plan) Spl.2. The standard sorting plan Spl.1 assigns to each sorting feature value (to the respected sorting code of each delivery address occurring) a sorting end location Ses.1, Ses.2, . . . of the standard region (first sorting end location region). The special sorting plan Spl.2 assigns to each sorting feature value in each case a sorting end location Ses.A, Ses.B, . . . of the special region (second sorting end location region). For example the standard sorting plan Spl.1 assigns to the sorting feature values Add.2.1, Add.2.2, . . . Add.2.9 the same sorting end location Ses.2 of the standard region. The special sorting plan Spl.2 assigns the same sorting end location Ses.B of the special region to these sorting feature values Add.2.1, Add.2.2, Add.2.9 and also to further sorting feature values.

For a standard postal item, in the first sorting pass the data-processing selection unit AE automatically selects a sorting end location of the standard region (first sorting end location region) in each case by applying the standard sorting plan Spl.1, for a special postal item on the other hand it selects a sorting end location of the special region (second sorting end location region) by applying the special sorting plan Spl.2.

If three sorting passes are performed, the selection unit AE applies a first standard sorting plan and a first special sorting plan in the first sorting pass. In the second sorting pass the selection unit AE applies a second standard sorting plan and a second special sorting plan. The two standard sorting plans can differ from one another, as can the two special sorting plans.

All sorting end locations of a sorting end location group which occur in a standard sorting plan, belong logically to the standard region. All sorting end locations of a sorting end location group which occur in a special sorting plan belong logically to the special region.

In the last sorting pass the selection unit AE applies a single sorting plan, which likewise assigns to each value group a sorting end location group respectively. In the last sorting pass however no distinction is made between different regions of sorting end locations. It is possible that in the last sorting pass both standard postal items and also special postal items will be unloaded into the same sorting end location.

In one embodiment the sorting plans are set up in advance and are embodied so that in the first sorting pass all standard postal items are likely to find space in the M(1) sorting end locations of the standard region and all special postal items in the M(2) sorting end locations of the special region. In one embodiment it is already counted during format separation how many postal items are standard postal items and how many postal items are special postal items, and the two sorting plans Spl.1, Spl.2 for the first sorting pass are set up using these two counts. In another embodiment historical data from earlier sorting passes is used and the sorting plans Spl.1, Spl.2 for the first sorting pass are already set up before the format separation. This variant of the embodiment does not require postal items to be counted during the format separation.

Typically there are far more standard postal items than special postal items, so that M(1): M(2)=9:1 applies for example.

The standard sorting plan Spl.1 and the special sorting plan Spl.1 for the first sorting pass are tailored to each other as follows:

- The standard sorting plan Spl.1 defines G(1) value groups amongst the possible or occurring delivery address identifiers. The standard sorting plan SPl.1 assigns the same sorting end location group of the standard region to all delivery address identifiers of such a value group. Each delivery address identifier belongs to precisely one such value group (delivery address group).
- The special sorting plan Spl.2 G(2) accordingly defines value groups from among the same possible or occurring delivery address identifiers as the standard sorting plan. The special sorting plan Spl.2 also assigns the same sorting end location to all delivery address identifiers of a value group.

The two sorting plans Spl.1, Spl.2 for the first sorting pass are tailored to one another so that each value group (delivery address group) of the standard sorting plan Spl.1 is a subset of precisely one value group of the special sorting plan Spl.2, i.e. is not divided between two groups of the special sorting plan Spl.2. Because M(1)>M(2) applies as a rule, G(2)<G(1). Therefore each (or at least almost each value group (delivery address group) of the special sorting plan consists of a number of value groups of the standard sorting plan. The value groups of the standard sorting plan Spl.1 are smaller than the value groups of the special sorting plan Spl.2, i.e. consist of fewer values.

In the example of FIG. 4 each sorting end location group consists of precisely one sorting end location in each case. The value groups of the standard sorting plan Spl.1 are each shown in one row of FIG. 4. For example the sorting feature values Add.1.1, Add.1.2, . . . Add.1.9 form a first value group WG.1. The sorting feature values Add.2.1, Add.2.2, . . . Add.2.9 form a second value group WG.2 and so forth.

The sorting feature values Add.1.1, Add.1.2, . . . , Add.10.1., . . . , Add.10.5 together form a value group WG.A of the special sorting plan Spl.2, since the special sorting plan Spl.2 assigns the same sorting end location Ses.A to all these sorting feature values. Accordingly the sorting feature values Add.11.1, Add.11.2, . . . , Add.20.6 form a further value group WG.B of the special sorting plan Spl.2.

As can be seen in FIG. 4, each value group WG.1, WG.2, . . . of the standard sorting plan Spl.1 is a subset of a value group WG.A, WG.B, . . . of the special sorting plan Spl.2. For example the value groups WG.1 to WG.10 of the first sorting plan Spl.1 are subsets of the same value group WG.A of the second sorting plan Spl.2. All value groups of both sorting plans Spl.1, Spl.2 are disjunct in pairs.

In the exemplary embodiment it is not known before the first sorting pass which items have which sorting feature value. Therefore it is not known in advance how many postal items are to be transported to a delivery address. Therefore in the first sorting pass it is automatically counted for each delivery address how many passing postal items in total are to be transported to this delivery address. This means that the delivery addresses to which postal items are to be transported at all is established in particular in this sorting process.

After the first sorting pass the standard postal items are distributed to the M(1) sorting end locations of the standard region. The special postal items are distributed to the M(2) sorting end locations of the special region. The standard postal items are thus located in at least M(1) trays, the special postal items in at least M(2) trays. In one embodiment all trays are embodied the same and so that each tray is capable of accepting both each standard postal item and each special postal item.

The M(1) trays with standard postal items are transported again after the first sorting pass to a feeder device ZE.1, ZE.2 in each case. The standard postal items are taken from these M(1) trays, wherein each tray is tipped and fed again to the respective feeder device ZE.1, ZE.2. Here a predetermined feeding sequence among the M(1) trays is adhered to and standard postal items from different trays are prevented from being mixed with one another. This feed sequence results from a predetermined sequence among the sorting end locations of the standard region (the M(1) tray positions on the horizontal conveyor system). In one embodiment the trays are emptied manually. In another embodiment an automatic tray handling system is used, which is described for example in U.S. Pat. No. 6,501,041 B1.

The standard postal items from the M(1) trays are thus fed back again to the sorting system, for which a predetermined feeding sequence among the M(1) trays is adhered to. Overlapping in time with the process of feeding back the standard postal items from the M(1) trays to the feeder devices operating in parallel, the special postal items are taken from the M(2) trays and fed individually to the manual input unit ZE.m.

Preferably the N sorting end locations which are used in the second (last) sorting pass are subdivided into two partitions. In the preceding sorting passes the partitions do not play any role. For example both the first partition Pa.1 and also the second partition Pa.2 each have N/2 sorting end locations, i.e. respectively half of all sorting end locations of the standard region. Each partition is assigned a respective feeder device ZE.1, ZE.2. The standard postal items which are fed by means of the first feeder device ZE.1, are divided between the sorting end locations of the first partition Pa.1. The standard postal items which are fed by means of the second feeder device ZE.2 are divided between the sorting end locations of the second partition Pa.2.

These partitions Pa.1, Pa.2 are not to be confused with the sorting end location regions for the first sorting pass. The partitions too are exclusively logically defined and identical trays continue to be used. Precisely one feeder device ZE.1, ZE.2 with a singulator Ver.1, Ver.2 and a subset of the sorting end locations (tray positions) belongs to each partition. Each tray position belongs during the entire second sorting pass to precisely one partition.

Division into partitions enables the two processes of feeding postal items to the one feeder device ZE.1 with the one singulator Ver.1 and feeding further postal items to the other feeder device ZE.2 with the other singulator Ver.2 and then processing these postal items to be performed decoupled from one another in time and for no synchronization to be necessary. The manual input device ZE.m serves both partitions Pa.1, Pa.2. The embodiment with the partitions also leads to shorter transport paths within the sorting system.

As already explained, the standard sorting plan Spl.1 and the special sorting plan Spl.2 are attuned to each other for the first sorting pass. Each value group (delivery address group) of the special sorting plan Spl.2 consists of a number of value groups of the standard sorting plan Spl.1. The special postal items with delivery addresses which belong to a value group are unloaded in one embodiment into a tray of a second sorting end location group, which is named in the special sorting plan. The standard postal items with the delivery addresses which correspond to this value group are divided between a number of trays of a number of first sorting end location groups from the standard sorting plan Spl.1.

The standard postal items of these numbers of trays are fed back in turn to the sorting system for the second sorting pass. Overlapping in time or preferably with a lead time the corresponding special postal items are likewise fed to the sorting system from the one tray with the same delivery addresses or the delivery addresses of the same delivery address group. The special postal items from this tray are fed in turn to the manual input ZE.m.

Preferably the feeding of all special postal items from the second sorting end location group is concluded when the standard postal items from a first sorting end location group are likewise already fed, but further standard postal items from other first sorting end location groups are still to be fed. Because the standard sorting plan Spl.1 and the special sorting plan Spl.2 are tailored to one another, this synchronized feeding is easily possible.

Figure 5:
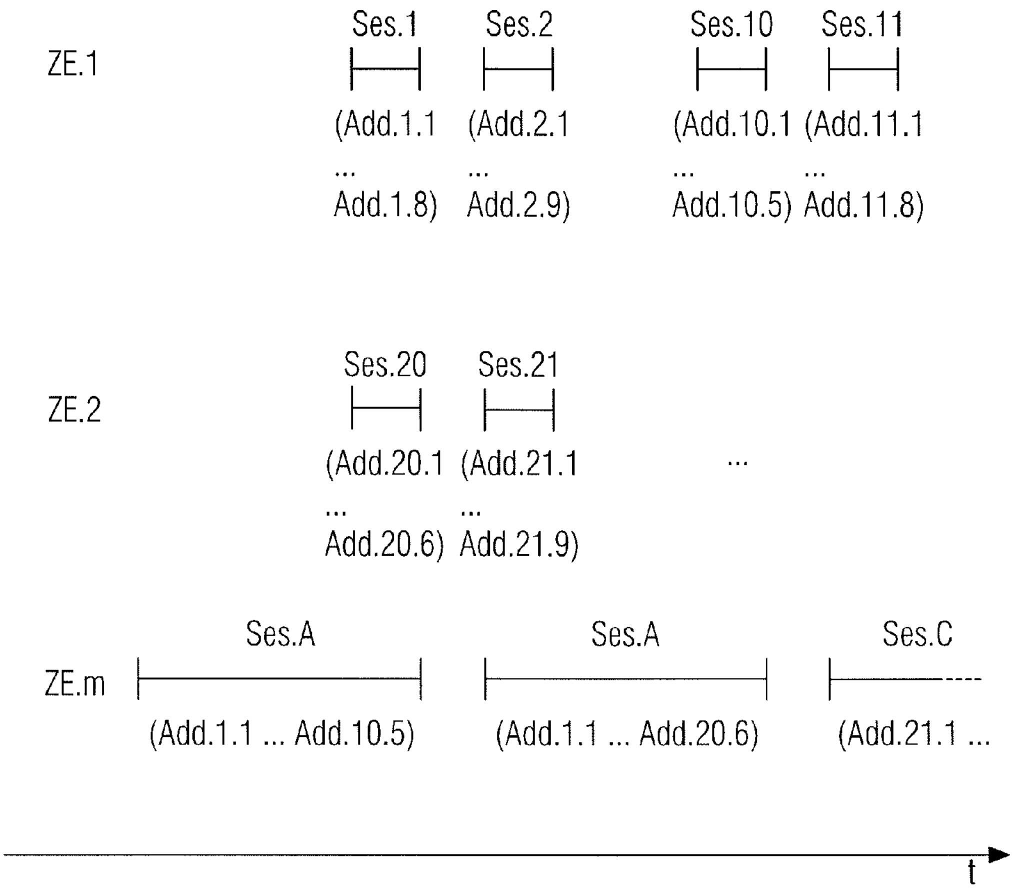
FIG. 5 shows an example of the time sequence during feeding in of postal items for the second sorting pass.

FIG. 5 shows by way of example how the feeding of the postal items for the second sorting pass is synchronized in time. The horizontal x-axis is the time axis. Shown on the y-axis above one another are the respective time curve during feeding to the manual input ZE.m and to the two feeder devices ZE.1, ZE.2. The period in which the postal items from a sorting end location are fed back again into the respective feeder device is shown. The assigned sorting feature values are entered by way of explanation.

In each sorting pass a number of postal items are to be stored in transfer pocket units in the sorting system until the postal items have reached the respective correct sorting end location (in the exemplary embodiment: tray position). This storage in transfer pocket units is affected by means of the mobile holder apparatus and above all by means of the fixed transfer pockets, which will be explained later.

In the second sorting pass to the standard postal items and the special postal items are brought into an upright position and brought in each case into a previously free holder apparatus. With the aid of the mobile holder apparatuses the standard postal items and the special postal items are distributed to the transfer pockets.

The transfer pockets greatly increase in each sort pass the throughput through the sorting system, and do this largely independently of how greatly the process of feeding the special postal items with delivery addresses of one delivery address group to the sorting system overlaps in time with the process of feeding the standard postal items with delivery addresses of the same delivery address group to the sorting system. The sole limitation results from the storage capacity of the fixed transfer pockets. In both sorting passes a transfer pocket is capable of accepting a number of postal items, especially such postal items as are to be transported to the same delivery address.

The effect of the transfer pockets is explained below by an example. The delivery addresses Add.a, . . . , Add.d form a single value group in all sorting plans used. The first sorting plan (is used in the first sorting pass for standard postal items) assigns to this value group the sorting end location (tray position) Ses.x.1. The second sorting plan (is used in the first sorting pass for special postal items) assigns to this value group the sorting end location Ses.x.2. In this example all postal items to the four delivery addresses fit into a single tray. After the first sorting pass, in the tray at tray position Ses.x.1, there are therefore standard postal items to the four delivery addresses Add.a, . . . , Add.d in a random sequence. After the first sorting pass, in the tray at tray position Ses.x.2, there are special postal items to Add.a, . . . , Add.d in a random sequence.

The trays are fed in accordance with a predetermined feed sequence to the feeder devices ZE.1, ZE.2 and emptied. The second sorting pass is performed. The one sorting plan for the second sorting pass assigns the sorting end location (tray position) Ses.y to this value group. After the second sorting pass all postal items to the four delivery addresses Add.a, . . . , Add.d are in the tray at tray position Ses.y. Thanks to the transfer pockets in the second sorting pass in this tray at Ses.y a desired sequence among these postal items is established. The postal items are distributed to transfer pockets in the second sorting pass and in this example this is done so that each transfer pocket only accepts postal items to a single delivery address. It is possible for the postal items to one delivery address to be distributed to a number of transfer pockets. Subsequently the transfer pockets are emptied in accordance with the predetermined sequence of the sort feature values (here: the delivery addresses). Initially all transfer pockets with postal items to the delivery address Add.a in the tray at the tray position Ses.y are emptied, then the transfer pockets with postal items to the delivery address Add.b in the same tray and so forth. This means that initially all items to Add.a arrive in this tray, then all postal items to Add.b and so forth.

Note: the emptying of the transfer pockets with postal items to Add.a is preferably already begun when all postal items to Add.a have been brought into transfer pockets. In the second sorting pass it is known how many postal items to Add.a are to be sorted in total. Through this embodiment these transfer pockets which have been emptied as quickly as possible are available earlier for postal items to other delivery addresses, e.g. for postal items to Add.b or Add.c or Add.d.

As has been explained above, in the first sorting pass a count is undertaken for each delivery address as to how many postal items are to be transported to this delivery address. In the second sorting pass, for each postal item, its delivery address is likewise determined. The path of each postal item through the sorting system is traced, e.g. by means of light barriers and/or a known transport speed. This means that the sorting system "knows" when a particular postal item has been brought into a transfer pocket. In the above example the four delivery addresses Add.a, Add.b, Add.c, Add.d form a value group. The sorting system continually checks whether each postal item with a delivery address of this value group has just been brought into a transfer pocket. As soon as this event is determined, the step of emptying the transfer pockets with the postal items to Add.a, . . . , Add.d into the assigned tray at the tray position Ses.y is initiated. This is because it is now certain that no further postal item to Add.a, . . . , Add.d will be unloaded into the transfer pocket. The transfer pockets are available after being emptied as early as possible for further postal items. The tray at Ses.y is initially brought in turn into a transfer position in each case in relation to the transfer pockets with postal items to Add.a, then to Add.b and so forth.

In the above example with the postal items to the value group Add.a, . . . , Add.d, the postal items have been distributed in the second sorting pass to different transfer pockets. In another embodiment a single transfer pocket is used, which can accept all postal items to these four addresses Add.a, . . . Add.d. The postal items are emptied in turn from the circulating storage pockets into this one fixed transfer pocket, and this is done as follows: initially all postal items to Add.a are emptied into the transfer pocket, then all postal items to Add.b and so forth. This means that in the fixed transfer pocket the postal items to Add.a lie at the bottom, then the postal items to Add.b and so forth.

The invention is explained below with reference to a numerical example. The sorting system used in this example possesses M=N=148 similar sorting end locations, wherein all 148 sorting end locations are used in both sorting passes. A ratio of 9:1 is assumed on the basis of historical data as the ratio of standard postal items to special postal items.

Two sorting passes are performed. In the first sorting pass M(1)=148 sorting end locations are used for the standard postal items and M(2)=10 sorting end locations for this special postal items. In the second sorting pass the 148 sorting end locations are divided into two partitions Pa.1, Pa.2 each of 74 sorting end locations. The sorting system has two feeder devices ZE.1, ZE.2 operating in parallel for the standard postal items and a manual input device ZE.m for the special postal items and also 800 similar holder apparatuses each for a postal item to be sorted.

In a sorting process a maximum of 9,000 standard postal items and 1,000 special postal items are sorted. Because 1,000 special postal items are expected and because in the first sorting pass M(2)=10 sorting end locations are used for the special postal items, a maximum of 100 holder apparatuses are needed and used for transport of special postal items. The sorting system is capable of establishing a delivery walk using 2 [partitions]*74 [sorting end locations of the first partition Pa.1]*74 [sorting end locations of the second partition Pa.2]=10.952 different delivery addresses. The standard sorting plan Spl.1 for the first sorting pass defines 148 value groups, the special sorting plan Spl.2 10 value groups.

List of reference characters

| Reference character | Meaning |
|---|---|
| Add.1.1, Add.1.2, . . . | Sorting feature value (delivery addresses) |
| AE | Evaluation unit |
| An-Beh | Drive for the sorting end locations |
| An-Sp | Drive for the storage pocket conveyor device Sp-FE |
| Bae | Image evaluation unit |
| Beh-FE | Tray conveyor device |
| Bel.1, Bel. 2, Bel.m | Loading stations |
| DSp | Data memory in which the sorting plans Spl.1, Spl.2, Spl able to be evaluated by a computer are stored |
| Fs.1, Fs.2 | Guide rails of the storage pocket conveyor device Sp-FE |
| Hal | Holder of the storage pocket Sp |
| Ka.1, Ka.2 | Horizontal cameras |
| Ka.m | Vertical camera |
| Ke-Sp | Machine-readable identifier of the storage pocket Sp |
| Kl.Sp | Flap on the floor of the storage pocket Sp |
| Kl.Zw | Flap on the floor of the fixed transfer pocket ZwSp |
| Kp.1, Kp.2 | Coupling elements of the storage pocket Sp in the form of hooks |
| M(1) | Number of sorting end locations of the standard region (first region) |
| M(2) | Number of sorting end locations of the special region (second region) |
| M | Number of sorting end locations of the sorting system |
| PS | Flat postal item |
| SB.a, SB.b | Lateral delimitation elements of the storage pocket Sp |
| Sep | Format separation device (separator) |
| Ses.1, Ses.2, . . . | Sorting end locations of the standard region (first region) |
| Ses.A, Ses.B, . . . | Sorting end locations of the special region (second region) |
| Sf.1, Sf.2 | Side surfaces of the storage pocket SP |
| Sp-FE | Storage pocket conveyor direction (pocket carousel) for the storage pockets |

-continued

| List of reference characters | |
|---|---|
| Reference character | Meaning |
| Spl.1 | Standard sorting plan (first sorting plan) for the first sorting pass |
| Spl.2 | Special sorting plan (second sorting plan) for the first sorting pass |
| Spl | Sorting plan for the second sorting pass |
| St | Stack of postal items lying horizontally in tray Beh |
| Sw.h | Rear, lower side wall of the transfer pocket ZwSp |
| Sw.v | Front, higher sidewall of the transfer pocket ZwSp |
| Ver.1, Ver.2 | Singulator of the feeder device ZE-1, ZE-2 |
| Weg-Beh | Removal conveyor device for filled trays |
| WG.1, WG.2, . . . | Value groups of the standard sorting plan Spl. 1 |
| WG.A, WG.B, . . . | Value groups of the special sorting plan Spl. 2 |
| ZE.1, ZE.2 . . . | Feeder devices operating automatically |
| ZE.m | Manual input |
| Zuf-Beh | Feed conveyor device for empty trays |
| ZwSp | Fixed transfer pocket with the side walls Sw. v and Sw. h and also the flap Kl. Zw. |

The invention claimed is:

1. A method for sorting a number of items according to a predetermined sorting feature in at least one sorting pass, wherein each item belongs either to a first item type or to a second item type, the method which comprises:

providing a sorting system with at least one first feeder device for items of the first item type, at least one second feeder device for items of the second item type, and a number of sorting end locations;

in each sorting pass for each item to be sorted performing the following steps:

feeding the item to the sorting system using a feeder device;

if the item belongs to the first item type, using a first feeder device for feeding the item and, if the item belongs to the second item type, using a second feeder device for feeding the item;

measuring a sorting feature value which the sorting feature assumes for the item;

selecting a sorting end location by using at least one computer-executable sorting plan and the measured sorting feature value;

wherein each sorting plan being used assigns to each sorting feature value occurring a respective sorting end location; and transporting the item to the selected sorting end location and placing the item into the selected sorting end location;

thereby performing at least two consecutive sorting passes including given sorting passes and a last sorting pass, in each given sorting pass except for a last sorting pass:

subdividing the sorting end locations in each case into a first sorting end location region and a second sorting end location region, with the first sorting end location region including more sorting end locations than the second sorting end location region;

using a first computer-executable sorting plan and a second computer-executable sorting plan for the given sorting pass;

for each item of the first item type, selecting a sorting end location of the first sorting end location region by applying the first sorting plan to the measured sorting feature value of the given item; and for each item of the second item type, selecting a sorting end location of the second sorting end location region by applying the second sorting plan to the measured sorting feature value of the given item; and in the last sorting pass:

executing a single computer-executable sorting plan; and for each item to be sorted, selecting a sorting end location of the sorting system by applying the sorting plan for the last sorting pass to the measured sorting feature value of the given item.

2. The method according to claim 1, wherein each sorting plan assigns a sorting end location in each case to a number of value groups such that:

each value group consists of at least one sorting feature value; and each value group of the first sorting plan, for a sorting pass which is not the last sorting pass, is a subset of a value group of the second sorting plan for this sorting pass.

3. The method according to claim 1, wherein each first feeder device separates a number of fed items to be sorted of the first item type such that, a stream of items spaced apart from one another leaves the first feeder device and each second feeder device transports a sequence of items to be sorted and fed one after the other of the second item type onwards to the sorting system.

4. The method according to claim 1, which comprises, in each sorting pass except for the last sorting pass, dividing the sorting end locations being used into the first sorting end location region and the second sorting end location region such that:

the first sorting end location region comprises at least twice as many sorting end locations as the second end location region; and in each case at least two value groups of the first sorting plan for a sorting pass are subsets of a same value group of the second sorting plan for this sorting pass.

5. The method according to claim 1, which comprises:

assigning each sorting end location of the second sorting end location region precisely one sorting end location of the first sorting end location region; and after each sorting pass except for the last sorting pass, beginning the step of feeding the items from a sorting end location of the second sorting end location region by means of a second feeder device, after the step of feeding the items from the assigned sorting end location of the first sorting end location region by means of a first feeder device was begun.

6. The method according to claim 1, wherein:

the sorting system additionally includes a conveyor device and a number of trays; and wherein in each sorting pass:

the conveyor device transports the trays along a conveyor path;

the step of selecting a sorting end location includes a step of selecting a point of the conveyor path; and during the step of bringing an item into a selected sorting end location, the event of a tray reaching the selected point triggers a step of forcing the given item into the given tray located at the selected point.

7. The method according to claim 1, which comprises:

predetermining at least one optically detectable attribute;

in the first sorting pass, measuring and storing the value that the sorting feature assumes for this item;

in each sorting pass additionally measuring the value the attribute has assumed for the given item for each item and each predetermined attribute; and in each subsequent sorting pass determining the measured and stored sorting feature value by means of at least one measured attribute value.

8. The method according to claim 1, which comprises:

configuring the sorting plans so that at least two different sorting feature values occur, each sorting plan used assigning to those the same sorting end location in each case;

in the last sorting pass, performing the steps that all items with one of these different sorting feature values in each case are distributed, depending on these sorting feature values, to a number of transfer pockets of the sorting system; and emptying these transfer pockets one after another;

the step of emptying a transfer pocket comprising a step that all items from this transfer pocket are brought into the sorting end location assigned by the sorting plan for the last sorting pass.

9. The method according to claim 1, wherein, for each item in each sorting pass except in the last sorting pass the respective first sorting plan is then applied for this sorting pass if this item was fed to the sorting system by means of the feeder device or a first feeder device, and the respective second sorting plan is then applied for this sorting pass if this item was fed to the sorting system by means of the feeder device or a second feeder device.

10. A sorting system for sorting a number of items according to a predetermined sorting feature, wherein each item to be sorted belongs either to a first item type or to a second item type, the sorting system comprising:

at least one first feeder device for items of the first item type and at least one second feeder device for items of the second item type;

at least one measuring device for each sorting pass in each case, a selection unit, and a data storage with at least one computer-executable sorting plan; and a transport device and a number of sorting end locations;

wherein each sorting plan stored in said data memory is configured to assign to each sorting feature value one sorting end location; each measuring device is configured to measure or to determine a value that the sorting feature assumes for an item to be sorted; said selection unit is configured to automatically select a sorting end location for an item to be sorted;

the sorting system being configured for performing sorting passes and in each sorting pass, for each item to be sorted:

if the item belongs to the first item type, feeding the item to the sorting system with a first feeder device;

if the item belongs to the second item type, feeding the item to the sorting system with a second feeder device;

measure with a respective measuring device the value which the sorting feature assumes for this item and select, with said selection unit, using a sorting plan and the measured sorting feature value, a sorting end location;

transport with said transport device the item to the selected sorting end location and place the item into the selected sorting end location wherein the sorting system is configured to perform at least two consecutive sorting passes;

said data memory having stored therein a first computer-executable sorting plan and a second computer-executable sorting plan for each sorting pass except for the last sorting pass and a computer-executable sorting plan for the last sorting pass;

the sorting system being configured such that, in each sorting pass except for the last sorting pass the sorting end locations used in the sorting pass are subdivided into a first sorting end location region and a second sorting end location region in each case;

said selection unit, for an item of the first item type to be sorted, by applying the first sorting plan for this sorting pass to the measured sorting feature value of the item, automatically selecting a sorting end location of the first sorting end location region;

said selection unit, for an item of the second item type to be sorted, by applying the second sorting plan for this sorting pass to the measured sorting feature value of the item, automatically selecting a sorting end location of the second sorting end location region; and said selection unit in the last sorting pass for each item to be sorted, by applying the sorting plan for the last sorting pass to the measured sorting feature value of the item, automatically selecting a sorting end location.

11. The sorting system according to claim 10, wherein each sorting end location used in the last sorting pass is configured so that the sorting end location in each sorting pass is capable of accepting at least one item of the first item type and also at least one item of the second item type.

12. The sorting system according to claim 10, which comprises:

a plurality of transfer pockets each enabled to accept at least one item to be sorted in each case;

all sorting plans stored in said data memory being configured so that two different sorting feature values occur to which each sorting plan assigns the same sorting end location in each case; and the sorting system being configured to perform the step in the last sorting pass that;

all items to be sorted with one of these different sorting feature values are distributed in each case, depending on the sorting feature values, to a number of transfer pockets and the transfer pockets are emptied one after another, wherein the step of emptying a transfer pocket includes bringing all items from the transfer pocket into the sorting end location assigned by the sorting plan for the last sorting pass.

* * * * *